(12) United States Patent
Wainwright et al.

(10) Patent No.: US 8,163,377 B2
(45) Date of Patent: Apr. 24, 2012

(54) HIGH TEMPERATURE RESISTANT FIBRES

(75) Inventors: Ronald Corbett Wainwright, Bromborough (GB); David Hywel Thomas, Bromborough (GB); Simon Paul Oliver, Bromborough (GB)

(73) Assignee: The Morgan Crucible Company PLC, Windsor, Berkshire (GB)

( * ) Notice: Subject to any disclaimer, the term of this patent is extended or adjusted under 35 U.S.C. 154(b) by 1023 days.

(21) Appl. No.: 12/092,792

(22) PCT Filed: Nov. 8, 2006

(86) PCT No.: PCT/GB2006/004182
§ 371 (c)(1),
(2), (4) Date: May 6, 2008

(87) PCT Pub. No.: WO2007/054697
PCT Pub. Date: May 18, 2007

(65) Prior Publication Data
US 2009/0130937 A1  May 21, 2009

Related U.S. Application Data

(60) Provisional application No. 60/757,586, filed on Jan. 10, 2006.

(30) Foreign Application Priority Data

Nov. 10, 2005 (GB) .................................. 0522980.2

(51) Int. Cl.
*B32B 25/02* (2006.01)

(52) U.S. Cl. ............... 428/296.7; 428/294.4; 428/300.4; 428/301.4

(58) Field of Classification Search ............... 428/296.7, 428/300.4, 301.4, 294.4
See application file for complete search history.

(56) References Cited

U.S. PATENT DOCUMENTS

| | | | |
|---|---|---|---|
| 3,402,055 A | 9/1968 | Harris et al. | |
| 3,865,599 A | 2/1975 | Mansmann et al. | |
| 3,982,955 A | 9/1976 | Mansmann et al. | |
| 3,996,145 A | 12/1976 | Hepburn | |
| 4,010,233 A | 3/1977 | Winter et al. | |
| 4,159,205 A | 6/1979 | Miyahara et al. | |
| 4,277,269 A | 7/1981 | Sweeting | |

(Continued)

FOREIGN PATENT DOCUMENTS

AU         1818170 A      2/1972

(Continued)

OTHER PUBLICATIONS

Yokogawa, Yoshiyuki, et al., "Apatite Hydrogel and Its Caking Behavior"; Key Engineering Materials vols. 254-256 (2004) pp. 63-66.

(Continued)

*Primary Examiner* — Lynda Salvatore
(74) *Attorney, Agent, or Firm* — Smith, Gambrell & Russell, LLP

(57) ABSTRACT

Thermal insulation comprises sol-gel formed fibers comprising 10 to 99 mol % of a refractory base composition, and 1 to 90 mol % of a component selected from earth metal oxides, alkali metal oxides, and mixtures thereof, and wherein said alkaline earth metal oxides if present comprise one or more of calcium oxide, strontium oxide, barium oxide or a mixture thereof. The refractory base comprises $SiO_2$ and $Al_2O_3$.

48 Claims, 10 Drawing Sheets

U.S. PATENT DOCUMENTS

Figure 1:
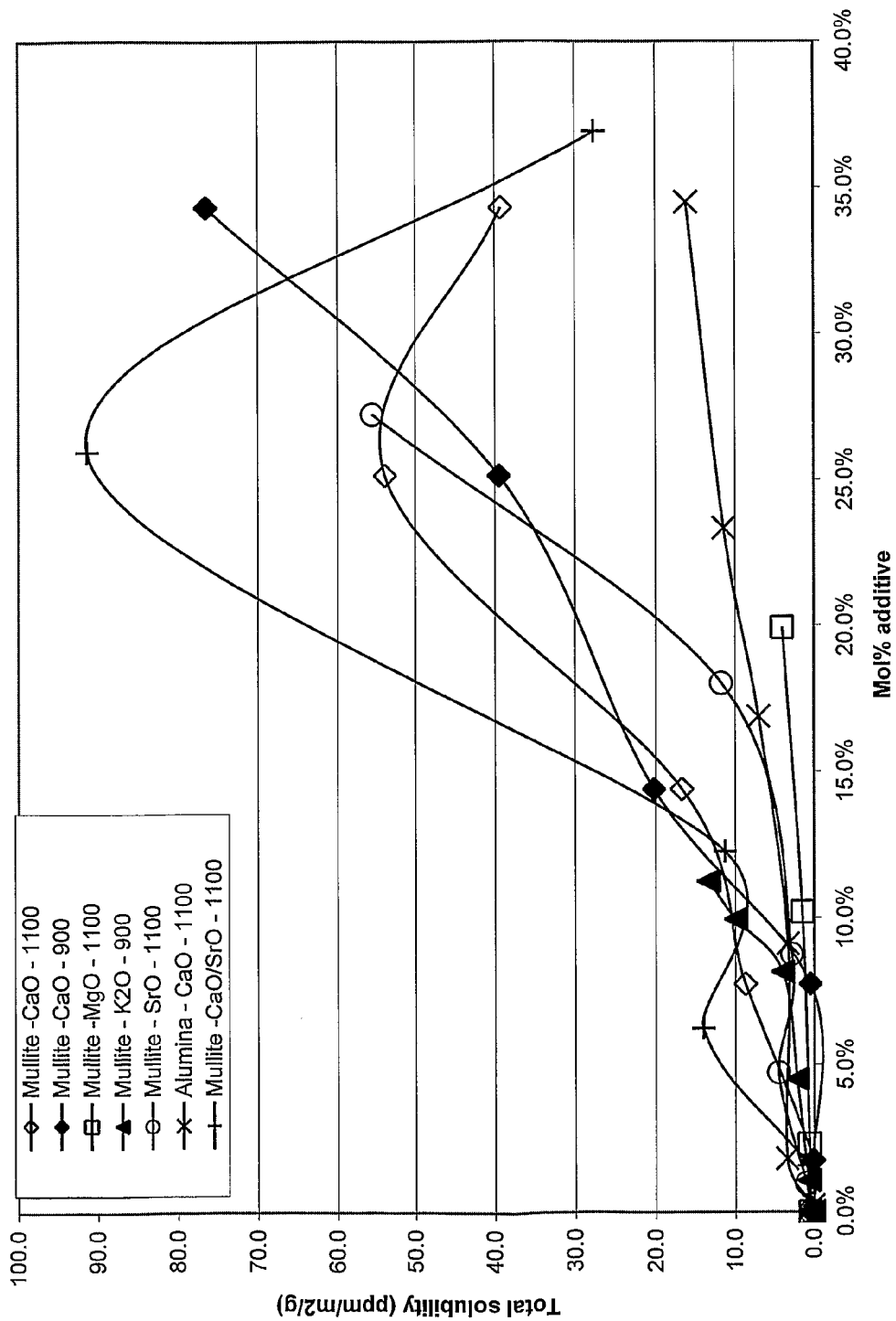

| | | | |
|---|---|---|---|
| 4,348,341 A | 9/1982 | Furuya et al. | |
| 4,659,617 A | 4/1987 | Fujii et al. | |
| 4,717,487 A | 1/1988 | Griffith et al. | |
| 4,792,478 A | 12/1988 | Taylor et al. | |
| 4,904,257 A | 2/1990 | Mori et al. | |
| 4,929,429 A | 5/1990 | Merry | |
| 4,999,168 A | 3/1991 | Ten Eyck | |
| 5,019,293 A | 5/1991 | Burlitch | |
| 5,028,397 A | 7/1991 | Merry | |
| 5,032,441 A | 7/1991 | Ten Eyck et al. | |
| 5,045,514 A | 9/1991 | Ismail et al. | |
| 5,145,613 A | 9/1992 | Arano et al. | |
| 5,153,031 A | 10/1992 | Burlitch | |
| 5,160,455 A | 11/1992 | Clark et al. | |
| 5,232,877 A | 8/1993 | Larnac et al. | |
| 5,248,637 A | 9/1993 | Taneda et al. | |
| 5,250,488 A | 10/1993 | Thelohan et al. | |
| 5,384,188 A | 1/1995 | Lebold et al. | |
| 5,580,532 A | 12/1996 | Robinson et al. | |
| 5,666,726 A | 9/1997 | Robinson et al. | |
| 5,714,421 A * | 2/1998 | Olds et al. | 501/36 |
| 5,811,063 A | 9/1998 | Robinson et al. | |
| 5,866,079 A | 2/1999 | Machida et al. | |
| 6,191,067 B1 | 2/2001 | Koike et al. | |
| 6,231,818 B1 | 5/2001 | TenEyck | |
| 6,602,369 B2 | 8/2003 | Shoji et al. | |
| 6,726,884 B1 | 4/2004 | Dillon et al. | |
| 6,733,628 B2 | 5/2004 | Dinwoodie et al. | |
| 6,759,015 B2 | 7/2004 | Peisert | |
| 6,809,050 B1 | 10/2004 | McGinnis | |
| 2002/0013209 A1 | 1/2002 | Prassas et al. | |
| 2003/0160350 A1 | 8/2003 | Shoji et al. | |
| 2003/0164583 A1 | 9/2003 | Eaton et al. | |
| 2004/0156760 A1 | 8/2004 | Watanabe | |
| 2004/0234436 A1 | 11/2004 | Howorth | |

FOREIGN PATENT DOCUMENTS

| | | |
|---|---|---|
| AU | 642493 | 12/1991 |
| AU | 661608 | 3/1994 |
| DE | 2037963 A1 | 2/1971 |
| DE | 42 28 355 C1 | 2/1994 |
| EP | 0 208 506 | 7/1986 |
| EP | 0 396 330 | 4/1990 |
| EP | 0 602 018 | 4/1990 |
| EP | 0 399 320 | 5/1990 |
| EP | 0 412 878 | 8/1990 |
| EP | 0 399 320 A1 | 11/1990 |
| EP | 0 412 878 A1 | 2/1991 |
| EP | 0 459 897 A1 | 4/1991 |
| EP | 0 459 897 | 5/1991 |
| EP | 0 491 141 | 10/1991 |
| EP | 0 459 897 A1 | 12/1991 |
| EP | 0 510 653 | 4/1992 |
| EP | 0560 479 | 2/1993 |
| EP | 0 586 797 | 6/1993 |
| EP | 0 586 797 A1 | 3/1994 |
| EP | 1 132 349 | 3/2000 |
| EP | 1 132 349 A1 | 9/2001 |
| EP | 1 323 687 | 12/2002 |
| EP | 1 323 687 A2 | 7/2003 |
| FR | 2 118 026 | 12/1971 |
| FR | 2 118 026 | 7/1972 |
| FR | 2 662 687 | 6/1990 |
| FR | 2 662 688 | 6/1990 |
| FR | 2 662 687 | 12/1991 |
| FR | 2 662 688 | 12/1991 |
| GB | 1 200 732 | 7/1966 |
| GB | 1264973 | 12/1968 |
| GB | 2 096 586 | 10/1982 |
| GB | 2 137 113 | 3/1983 |
| JP | 54-23727 | 2/1979 |
| JP | 59-82412 | 5/1984 |
| JP | 62-100457 | 5/1987 |
| JP | 63 242978 | 7/1988 |
| JP | 5-170525 | 7/1993 |
| JP | 6-316815 A | 11/1994 |
| JP | 7145239 | 6/1995 |
| JP | 2002-105823 | 4/2002 |
| RU | 2212388 | 9/2003 |
| SU | 1154243 | 5/1985 |
| WO | WO 86/04807 | 8/1986 |
| WO | WO 87/05007 | 8/1987 |
| WO | WO 89/12032 | 12/1989 |
| WO | WO 90/02713 | 3/1990 |
| WO | WO 91/00140 | 1/1991 |
| WO | WO 92/06768 | 4/1992 |
| WO | 92/09541 | 6/1992 |
| WO | WO 92/09536 | 6/1992 |
| WO | WO 92/09541 | 6/1992 |
| WO | WO 93/15028 | 8/1993 |
| WO | WO 93/22251 | 11/1993 |
| WO | WO 94/15883 | 7/1994 |
| WO | WO 96/04214 | 2/1996 |
| WO | WO 97/16386 | 5/1997 |
| WO | WO 99/46028 | 9/1999 |
| WO | WO 00/33946 | 6/2000 |
| WO | WO 00/75496 | 12/2000 |
| WO | WO 01/68544 | 9/2001 |
| WO | WO 02/42233 | 5/2002 |
| WO | WO 03/059835 | 7/2003 |
| WO | WO 03/060016 | 7/2003 |
| WO | WO 2004/031544 | 4/2004 |
| WO | WO 2004/064996 | 8/2004 |
| WO | WO 2005/000754 | 1/2005 |
| WO | WO 2005/000971 | 1/2005 |

OTHER PUBLICATIONS

Ryu, H.S., et al., "Characterization of $CaO-SiO_2-B_2O_3$ Glass-Ceramics and Effect of Composition on Bioactivity"; Key Engineering Materials vols. 240-242 (2003) pp. 261-264.

Padilla, Sussette, et al., "Concentrated Suspensions of Hydroxyapatite for Gelcasting Shaping", Key Engineering Materials vols. 254-256 (2004) pp. 35-38.

Pryce, R.S., et al., "Dissolution Characteristics of Bioactive Glasses", Key Engineering Materials vols. 240-242 (2003) pp. 201-204.

Saravanapavan, P., et al., "Dissolution of Bioactive Gel-Glass Powders in the $SiO_2$-CaO System", Key Engineering Materials vols. 240-242 (2003) pp. 213-216.

Forsback, A.P., et al., "Effect of Ionic Variables ($SiO_2$, $Ca^{2+}$, $PO_4^{3-}$) on Biomimetic Mineralization", Key Engineering Materials vols. 240-242 (2003) pp. 249-252.

Sakka, S., "Fibers from the Sol-Gel Process", Technology for Thin Films, Fibers, Preforms, Electronics and Specialty Shapes (1988), Institute for Chemical Research, Kyoto University, Japan.

Knudsen, Torben, et al., "In Vitro Dissolution Rate of Mineral Fibres at pH 4.5 an d7.4—A New Mathematical Tool to Evaluate the Dependency on Composition", Rockwool International A/S, Hedehusene (Denmark).

Song, K. Chang, "Preparation of Mullite Fibers by the Sol-Gel Method", Journal of Sol-Gel Science and Technology 13, 1017-1021 (1998); Department of Chemical Engineering, Konyang University, Nonsan, Chungnam 320-030, Korea.

Keiichi, et al., "Long Lasting Sound Absorbing Thermal Insulator", Chemical Abstracts, vol. 110, No. 8, Apr. 8, 1989, p. 429.

UNIFRAX Product Information Sheet, Fiberfrax® Blanket and Mat Products.

3M Nextel™ Textiles catalog—Ceramic fiber products for outer space applications; 5 pages.

High Temperature Insulation Data Sheet—Saffil HX Bulk Fibre Product Data Sheet; 2 pages.

"Decision on Grant Patent for Invention" for Application No. 2008123517/03(028455) filed Nov. 8, 2006 w/ English language translation.

Song, K. C.; "Preparation of Mullite Fibers by The Sol-Gel Method"; Springer, New York, New York; Journal of Sol-Gel Science and Technology, vol. 13, Nos. 1-3, 1998—pp. 1017.

Chemical Abstracts, vol. 110, No. 8, Apr. 8, 1989, Columbus, OH, Abstract No. 140412a, Keiichi, S.: "Long Lasting Sound Absorbing Thermal Insulator", p. 329.

International Search Report for PCT/GB2006/004182.

* cited by examiner

HIGH TEMPERATURE RESISTANT FIBRES

REFERENCE TO RELATED APPLICATION

This application claims the benefit of U.S. Provisional application 60/757,586 filed on Jan. 10, 2006 and United Kingdom application GB 05 22 980.2 filed Nov. 10, 2005 which are relied on and incorporated herein by reference.

FIELD OF THE INVENTION

This invention relates to high temperature resistant fibres formed by a sol-gel process. Such fibres are particularly, although not exclusively, for use as thermal insulating materials. The invention is also concerned with the use of such fibres in support structures for catalyst bodies in pollution control devices such as automotive exhaust system catalytic converters and diesel particulate filters.

BACKGROUND OF INVENTION

Fibrous materials are well known for their use as thermal insulating materials and are also known for their use as strengthening constituents in composite materials such as, for example, fibre reinforced cements, fibre reinforced plastics, and as a component of metal matrix composites.

Prior to 1987 there were four principle types of fibrous materials used for making thermal insulation products [such as, for example, blanket, vacuum formed shapes, and mastics]. These were made by two principal manufacturing routes although the details of the particular routes vary according to manufacturer. The fibres and routes were (in order of increasing cost and temperature performance):
Melt formed fibres
    Glass wools
    Mineral wools
    Aluminosilicate fibres
Sol-gel process fibres
    So-called polycrystalline fibres Because of the history of asbestos fibres, a lot of attention has been paid to the relative potency of a wide range of fibre types as a cause of lung disease. Studies of the toxicology of natural and man-made fibres led to the idea that it was the persistence of fibres in the lung that caused problems. Accordingly, the view developed that if fibres can be removed from the lung quickly then any risk to health would be minimised. The concepts of "biopersistent fibres" and "biopersistence" arose—fibres that last for a long time in the animal body are considered biopersistent and the relative time that fibres remain in the animal body is known as biopersistence. Whilst several glass systems were known to be soluble in lung fluids, resulting in low biopersistence, there was a problem in that such glass systems were generally not useful for high temperature applications. A market need was seen for a fibre that could have a low biopersistence combined with a high temperature capability. In 1987 Johns Manville developed such a system based on a calcium magnesium silicate chemistry. Such material not only had a higher temperature capability than traditional glass wools, but also had a higher solubility in body fluids than the aluminosilicate fibres mostly used for high temperature insulation. Such low biopersistent fibres have been developed since, and a range of alkaline earth silicate [AES] fibres are now on the market. Patents relating to AES fibres include:

International Patent Application No. WO87/05007—the original Johns-Manville application—which disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure.

International Patent Application No. WO89/12032 disclosed additional fibres soluble in saline solution and discussed some of the constituents that may be present in such fibres.

European Patent Application No. 0399320 disclosed glass fibres having a high physiological solubility and having 10-20 mol % $Na_2O$ and 0-5 mol % $K_2O$. Although these fibres were shown to be physiologically soluble their maximum use temperature was not indicated.

Further patent specifications disclosing selection of fibres for their saline solubility include for example European 0412878 and 0459897, French 2662687 and 2662688, WO86/04807, WO90/02713, WO92/09536, WO93/22251, WO93/15028, WO94/15883, WO97/16386, WO2003/059835 WO2003/060016, EP1323687, WO2005/000754, WO2005/000971, and U.S. Pat. No. 5,250,488.

The refractoriness of the fibres disclosed in these various prior art documents varies considerably and for these alkaline earth silicate materials the properties are critically dependent upon composition.

As a generality, it is relatively easy to produce alkaline earth silicate fibres that perform well at low temperatures, since for low temperature use one can provide additives such as boron oxide to ensure good fiberisation and vary the amounts of the components to suit desired material properties. However, as one seeks to raise the refractoriness of alkaline earth silicate fibres, one is forced to reduce the use of additives since in general (albeit with exceptions) the more components are present, the lower the refractoriness.

WO93/15028 disclosed fibres comprising CaO, MgO, $SiO_2$, and optionally $ZrO_2$ as principal constituents. Such AES fibres are also known as CMS (calcium magnesium silicate) or CMZS ((calcium magnesium zirconium silicate) fibres. WO93/15028 required that the compositions used should be essentially free of alkali metal oxides. Amounts of up to 0.65 wt % were shown to be acceptable for materials suitable for use as insulation at 1000° C.

WO94/15883 disclosed a number of such fibres usable as refractory insulation at temperatures of up to 1260° C. or more. As with WO93/15028, this patent required that the alkali metal oxide content should be kept low, but indicated that some alkaline earth silicate fibres could tolerate higher levels of alkali metal oxide than others. However, levels of 0.3% and 0.4% by weight $Na_2O$ were suspected of causing increased shrinkage in materials for use as insulation at 1260° C.

WO97/16386 disclosed fibres usable as refractory insulation at temperatures of up to 1260° C. or more. These fibres comprised MgO, $SiO_2$, and optionally $ZrO_2$ as principal constituents. These fibres are stated to require substantially no alkali metal oxides other than as trace impurites (present at levels of hundredths of a percent at most calculated as alkali metal oxide). The fibres have a general composition
    $SiO_2$ 65-86%
    MgO 14-35%
with the components MgO and $SiO_2$ comprising at least 82.5% by weight of the fibre, the balance being named constituents and viscosity modifiers.

WO2003/059835 discloses certain calcium silicate fibres in which $La_2O_3$ or other lanthanide additives are used to improve the strength of the fibres and blanket made from the fibres. This patent application does not mention alkali metal oxide levels, but amounts in the region of ~0.5 wt % were disclosed in fibres intended for use as insulation at up to 1260° C. or more.

Such fibres are made from the melt by forming a molten stream and converting the stream into fibre either by permitting the stream to contact a spinning wheel, or by using an air blast directed at the stream. Features of such melt formed fibres include:

- since the rapid changes in temperature during the forming process results in a rapid change of viscosity, the fibres come in a wide range of diameters
- the fibres have a much lower strength than might be expected from the bulk properties of the fibre composition, the applicants suspect due to the introduction of flaws in the fibre forming process
- a large amount of shot (unfiberised material) is normal for such materials—typically >40% by weight comprises shot—the presence of shot raises thermal conductivity of fibrous insulation materials—although fibre can be deshotted this adds to expense.

Also, the scope of such low biopersistence fibres is limited in that above about 1300° C. they tend to deteriorate in performance. Further, for some applications the mechanical properties of such fibres are not adequate. As an example, most modern vehicles are equipped with pollution control devices such as catalytic converters or diesel particulate filters. Such pollution control devices typically comprise a treated monolithic ceramic structure (typically a honeycomb construction) used to purify exhaust gases at high temperatures and secured within a metal housing by a resilient and flexible mat that is typically formed from inorganic fibres. Exhaust gases enter one end of the control device, where the gasses are treated, and exit the other end.

Such exhaust catalytic converters and diesel particulate filters require fibres that will maintain their compressive strength and resilience over a wide range of temperatures. [By resilience, in this context, is meant the ability of an article to recover its initial shape after deformation]. To cope with the high temperatures (typically 850° C.-950° C. for present catalytic converters) and constant thermal cycling encountered in such devices requires fibrous material that has a high degree of resilience to provide a support to the fragile catalytic structure. At present catalytic converters use either aluminosilicate fibres that have been heat treated to provide the appropriate degree of resilience, or sol-gel formed alumina and/or mullite fibres. The problem is however that both aluminosilicate fibres and such sol-gel formed fibres have low solubility in siulated body fluids, and are expected to have high biopersistence compared with AES fibres. There are no known low biopersistence fibres that are suitable for use in such pollution control devices. This is of concern, since the large number of such pollution control devices and their widespread use gives a great opportunity for exposure to the fibres.

Alternative low biopersistence fibres that have been proposed are alkaline earth aluminates. Such materials have been suggested as calcium aluminate (EP0586797) and strontium aluminate (WO96/04214). Such fibres are not produced commercially, but as they are described as formed from a melt they would have the same characteristic variability in fibre diameter and high shot content.

Vitreous fibres such as melt formed silicate fibres are subject of regulation in Europe, and different fibre classes have different hazard classifications and labelling requirements. Conventional vitreous alumino-silicate fibres require more stringent labelling concerning health hazards [as so-called category 2 carcinogens] than do alkaline earth silicate fibres which are exonerated from carcinogen classification. Sol-gel polycrystalline fibres are not, as yet the subject of hazard classification in Europe.

Conventional vitreous fibre processing techniques used for the production of alkaline earth silicate fibres discussed above require conversion of the raw materials into a homogeneous high temperature melt and subsequent fiberisation of the melt.

In sol-gel fibre processing, a sol is formed from precursor materials. Fibrous gels are formed from the sols (generally at around room temperature), and then are converted to glass or ceramic fibres by heating at elevated temperatures (e.g. 700° C. to 2000° C.). Various kinds of fibres have been prepared by this type of sol-gel technique (e.g. silica, alumina-silica, zirconia, alumina and titania).

Sol-gel formation of fibres has the advantages over melt forming that:
a) melt forming becomes progressively more difficult as the temperature of the melt increases and uncontrolled crystallisation can occur
b) as higher melt temperatures are required it becomes difficult to find materials for the apparatus that have a reasonable working life at the temperatures involved
c) sol-gel techniques enable the production of materials where the components are insoluble or immiscible in the melt.

Sol-gel formed fibres tend to have a lower (but not zero) shot content in comparison with melt formed fibres. Known refractory sol-gel formed fibres have a range of compositions ranging from, for example, mullite fibres of a general composition $3Al_2O_3.2SiO_2$ through to fibres that are almost pure $Al_2O_3$. Examples include products under the trade names:

MAFTEC™ a fibre produced by Mitsubishi Chemical Corporation and which comprises ~72% by weight $Al_2O_3$ and 28% by weight $SiO_2$, and alleged to have a mean diameter in the region of 4 μm.

SAFFIL™ a fibre produced by Saffil Limited and which comprises ~96-97% by weight $Al_2O_3$ and 3-4% by weight $SiO_2$, with trace elements <0.5%, and alleged to have a mean diameter in the region 3-4 μm.

NEXTEL™ a fibre produced by 3M and which has a range of compositions from ~62% by weight $Al_2O_3$, 24% by weight $SiO_2$, and ~14% by weight $B_2O_3$ through to >99% by weight $Al_2O_3$, 0.2-0.3 by weight $SiO_2$ and 0.4-0.7% $Fe_2O_3$. Nextel fibres are alleged to have a typical mean diameter of 10-12 μm.

FIBERMAX™ a fibre produced by Toshiba Monofrax and Unifrax Corporation, and which comprises ~72% by weight $Al_2O_3$, 27% by weight $SiO_2$, and ~1% by weight other components including very small quantities of MgO, CaO and $Na_2O$ [<0.2% each], and alleged to have a mean fibre diameter in the region of 2-3.5 μm.

all of which contain various proportions of $SiO_2$ and $Al_2O_3$. The relatively high degree of resilience of sol-gel formed fibres in comparison to alkaline earth silicate fibres at temperatures in excess of about 1300° C. makes them ideally suited to catalytic converters. For example, a few of the many patents describing the use of such sol-gel formed fibres in catalytic converters include; U.S. Pat. Nos. 4,929,429, 5,028, 397, 5,032,441, 5,580,532, 5,666,726, 5,811,063, 6,726,884 WO00/75496 and WO2004/064996.

Biopersistence is not the sole factor in ascertaining the potential health hazards of fibrous materials. Also of relevance is the amount of fibre that is respirable. If a fibre does not enter the lung it cannot cause damage to the lung. Sol-gel fibre techniques permit the production of fibres having a relatively narrow fibre diameter distribution, and the argument of sol-gel fibre manufacturers is that this enables the reduction in the proportion of respirable fibres from their materials. Reduction is not the same as elimination however, and the production of a sol-gel fibre that has acceptable mechanical and thermal properties and that is soluble in physiological saline solutions offers the opportunity of not only limiting the amount of respirable fibre, but also ensuring that what fibre is respirable has a reduced biopersistence in comparison with conventional sol-gel fibres.

The applicant has discovered that it is possible to produce sol-gel formed fibres that exhibit a low shrinkage at elevated temperature, and a high resilience at temperature, and that also have the virtue of having a degree of solubility in body fluids that while not as high as the best alkaline earth silicate fibres, is significantly higher than the solubility of pure mullite fibres. There is a trade-off in these requirements and the present invention permits the production of highly refractory—slightly soluble materials at one extreme to very soluble—reasonably refractory materials at the other with a range of characteristics in between.

U.S. Pat. No. 5,019,293 discloses methods of making magnesium aluminium silicate sol-gel fibres in which the ratio of Mg to Si ranges from 0.3:1 to 4:1 and the ratio of Mg to Al ranges from 0.12:1 to 2:1. The method involved comprises the manufacture of a low concentration sol [<1% solids] using hydrogen peroxide in the sol forming process, concentrating the sol, and forming fibre by:
  extruding the sol into a basic solution
  extruding the sol into air and onto a coated substrate
  coating a string or filament with sol drying the fibres then takes 8 hours to 3 days and the fibres are short [1 mm to 2 cm] and with aspect ratios of 50 to 200 this implies fibre thicknesses in the range 5-400 μm. Such fibres would not be considered as useful for insulation purposes.

JP59082412 discloses sol-gel fibres comprising <6 wt % [~14 mol %] MgO which are indicated in the abstract as having improved flexibility. A comparative example with 10 wt % [~22 mol %] MgO was indicated as being unsatisfactory. No mention is made in the abstract of the use of these fibres as thermal insulation.

U.S. Pat. No. 3,982,955 discloses alumino-silicate sol-gel fibres comprising 0-5% MgO.

U.S. Pat. No. 4,010,233 discloses $MgO.Al_2O_3$ sol-gel fibres.

SUMMARY OF THE INVENTION

Accordingly the present invention provides thermal insulation comprising sol-gel formed fibres comprising 10 to 99% of a refractory base composition, and 1 to 90 mol % of a component selected from alkaline earth metal oxides, alkali metal oxides, and mixtures thereof and wherein said alkaline earth metal oxides if present comprise one or more of calcium oxide, strontium oxide, barium oxide or a mixture thereof. This does not preclude the presence of magnesium oxide in addition to these named oxides, but presence of magnesium oxide is discouraged for the reasons set out below.

Preferably said refractory base composition totals more than 65 mol % of the composition, preferably more than 70 mol % of the composition, more preferably more than 75 mol % of the composition, yet still more preferably, more than 80 mol % of the composition.

Preferably the refractory base composition comprises $Al_2O_3$ and $SiO_2$.

More preferably $Al_2O_3$ is present in amounts of at least 25 mol %.

The invention also provides sol-gel formed fibres comprising in mol %:
  $Al_2O_3$ and $SiO_2$ in such amounts that $Al_2O_3+SiO_2$ is in the range 50% to 99% (preferably 65% to 95%)
  one or more alkaline earth oxides and/or alkali metal oxides comprising in total 1%-50% (preferably 5 to 35%) and in which where present the alkaline earth metal oxide comprises one or more of calcium oxide, strontium oxide, barium oxide or a mixture thereof.

The invention also provides sol-gel formed fibres comprising in mol %:
  $Al_2O_3$ >25 mol %
  and $SiO_2$ in such amounts that $Al_2O_3+SiO_2$ >65%
  one or more alkaline earth oxides and/or alkali metal oxides comprising in total 5%-30%.

The alkaline earth metal oxide preferably is or comprises calcium oxide.

The present invention further provides that the alkali metal oxide is one or more of lithium oxide, sodium oxide, potassium oxide, rubidium oxide, caesium oxide or a mixture thereof. The alkali metal oxide preferably is or comprises potassium oxide.

DETAILED DESCRIPTION

Figure 2:
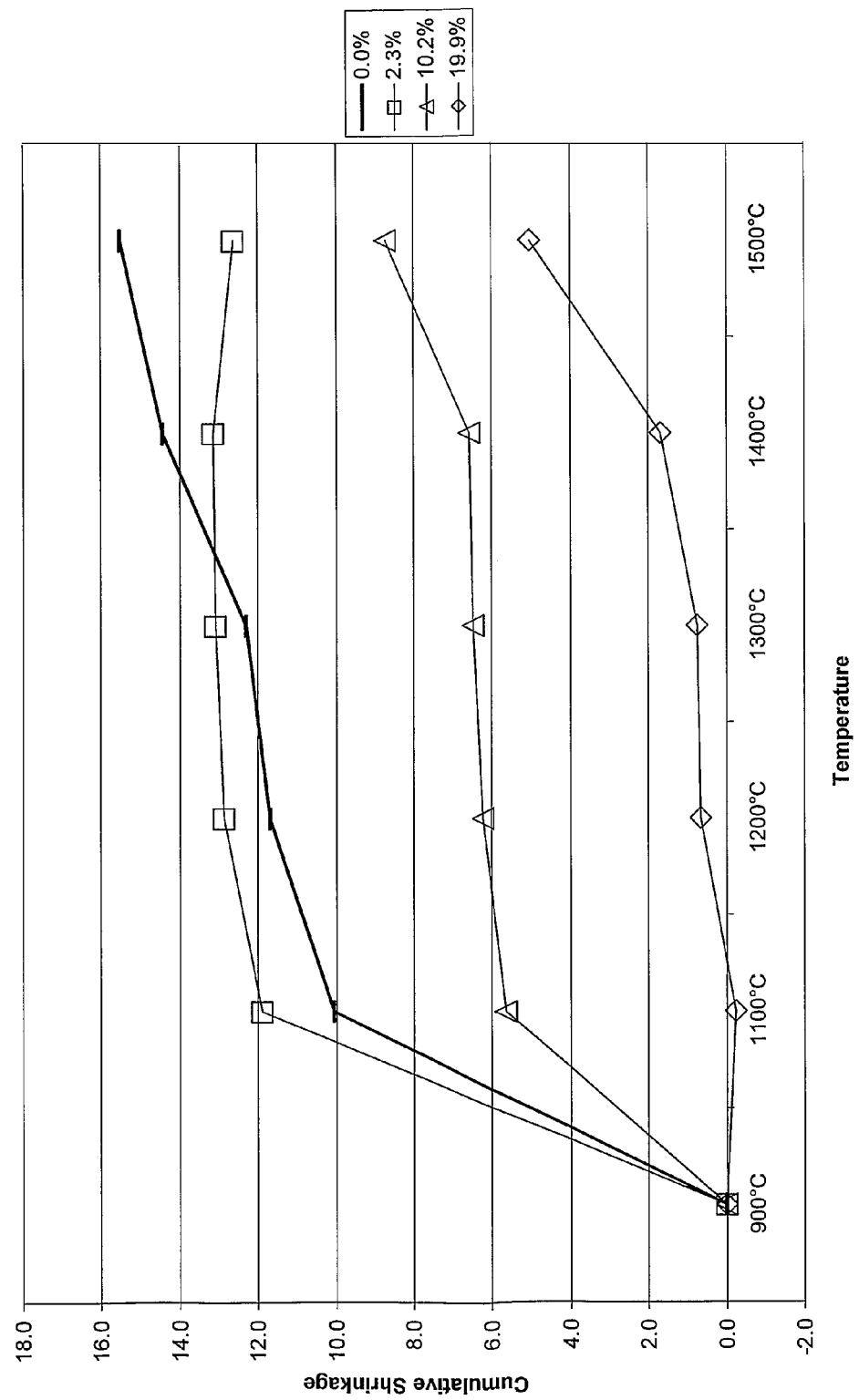
Figure 3:
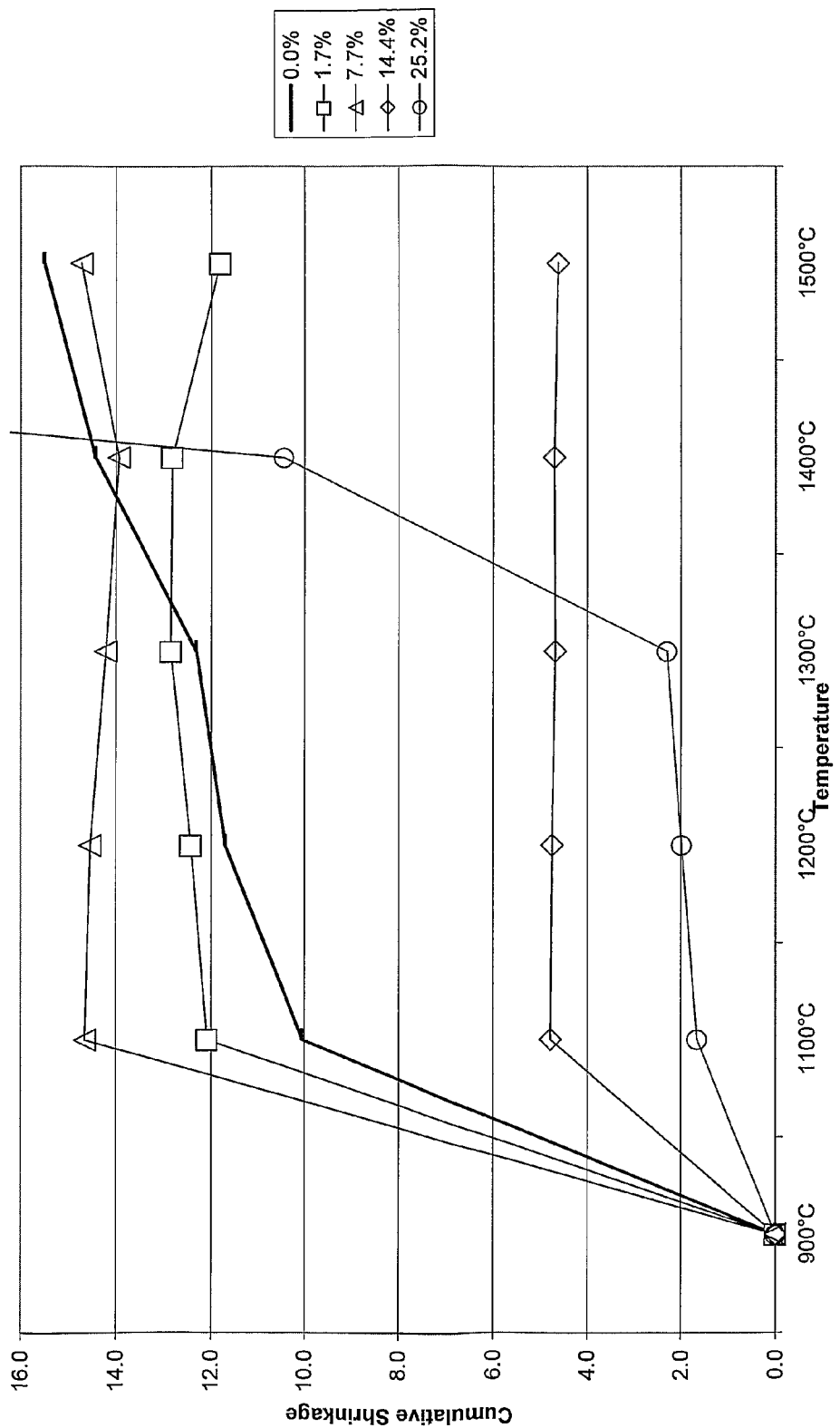
Figure 4:
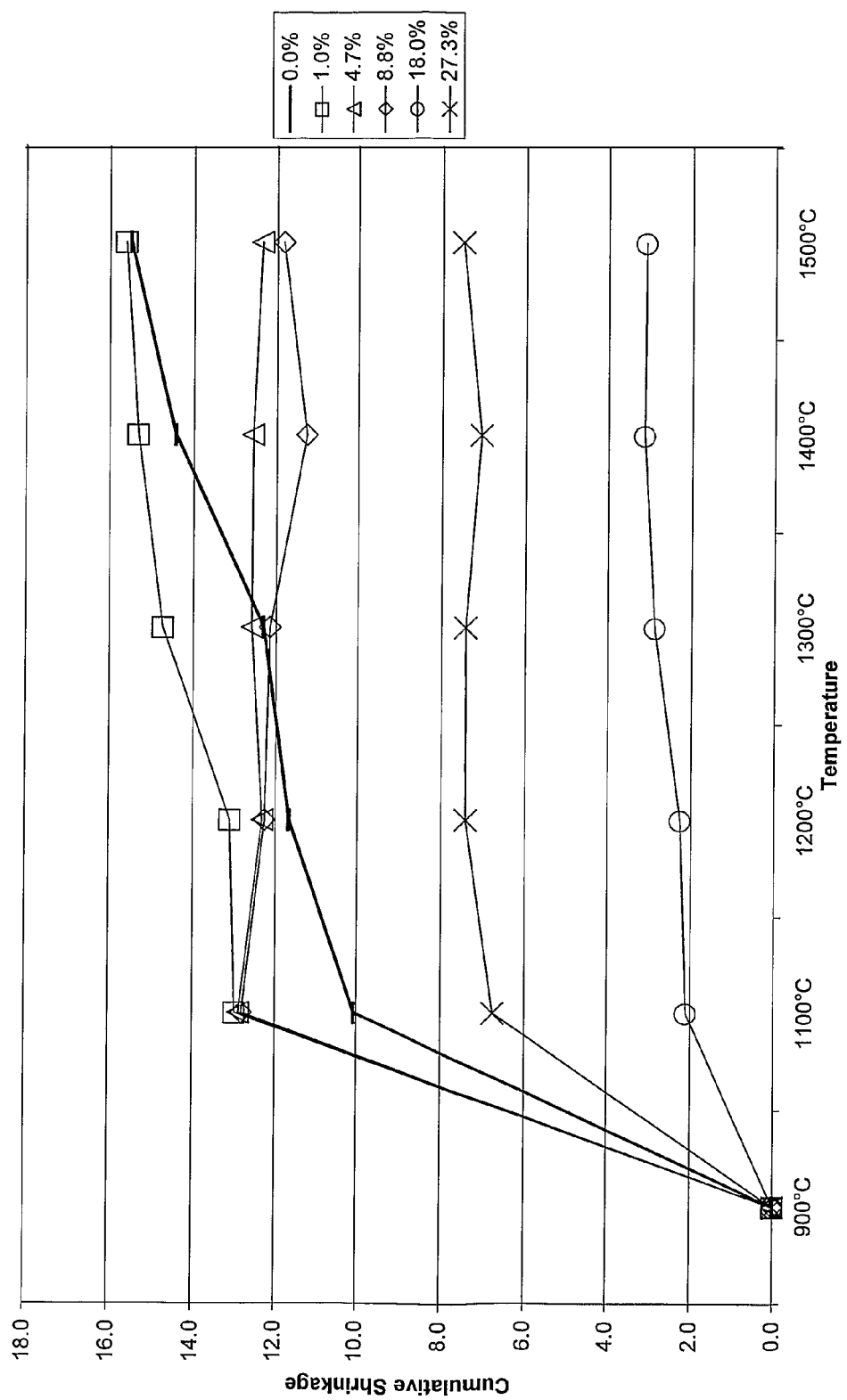
Figure 5:
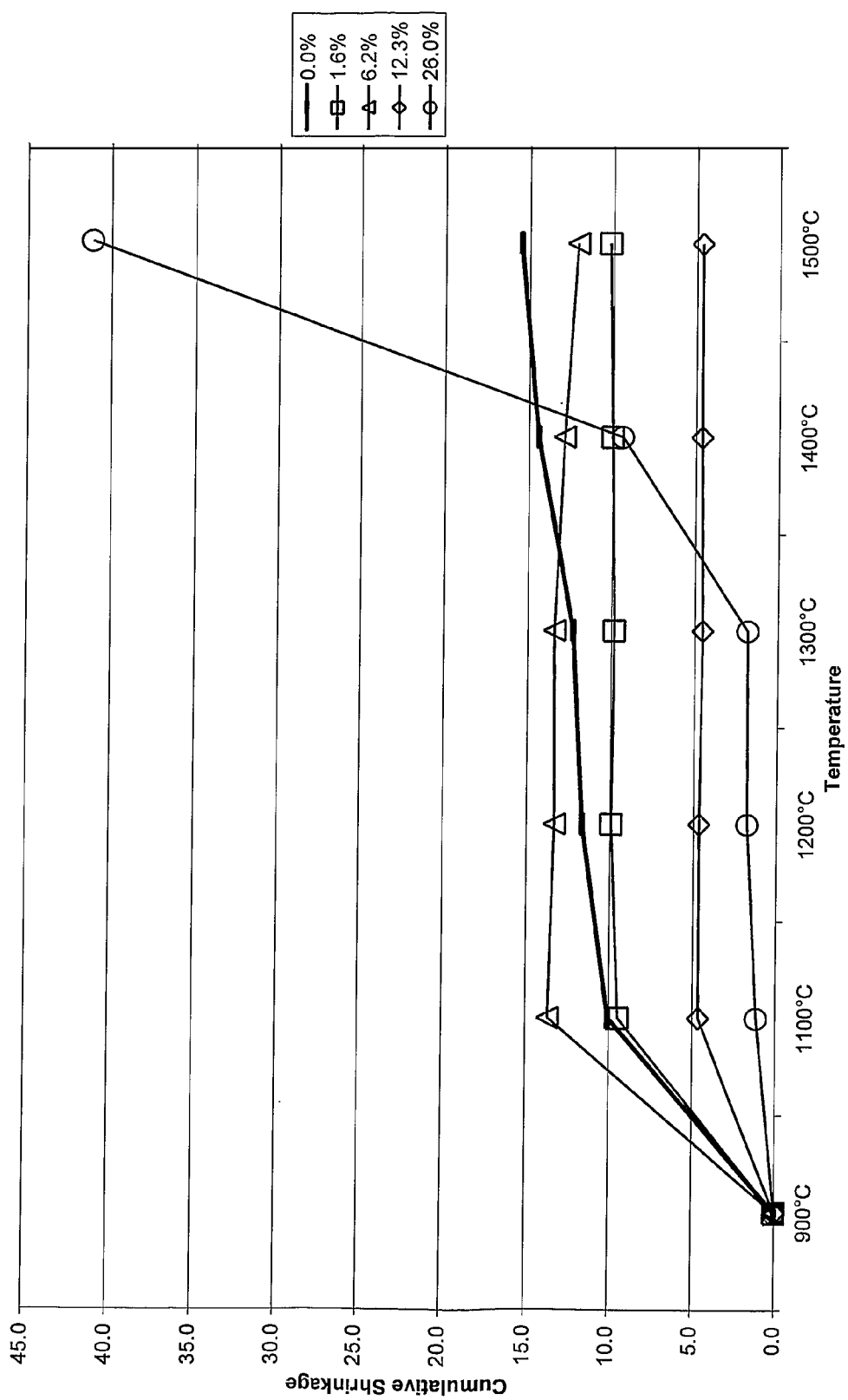
Figure 6:
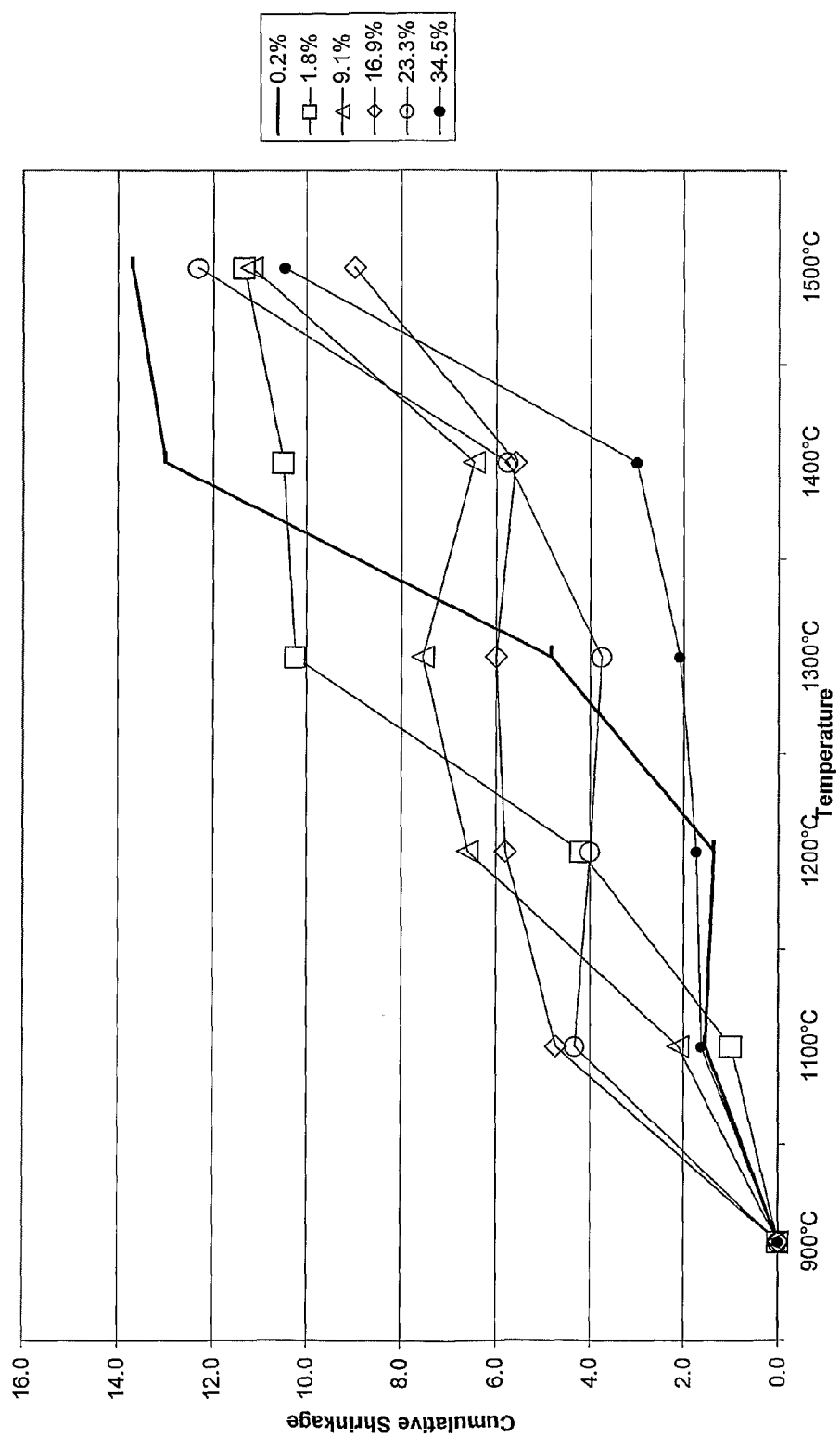
Figure 7:
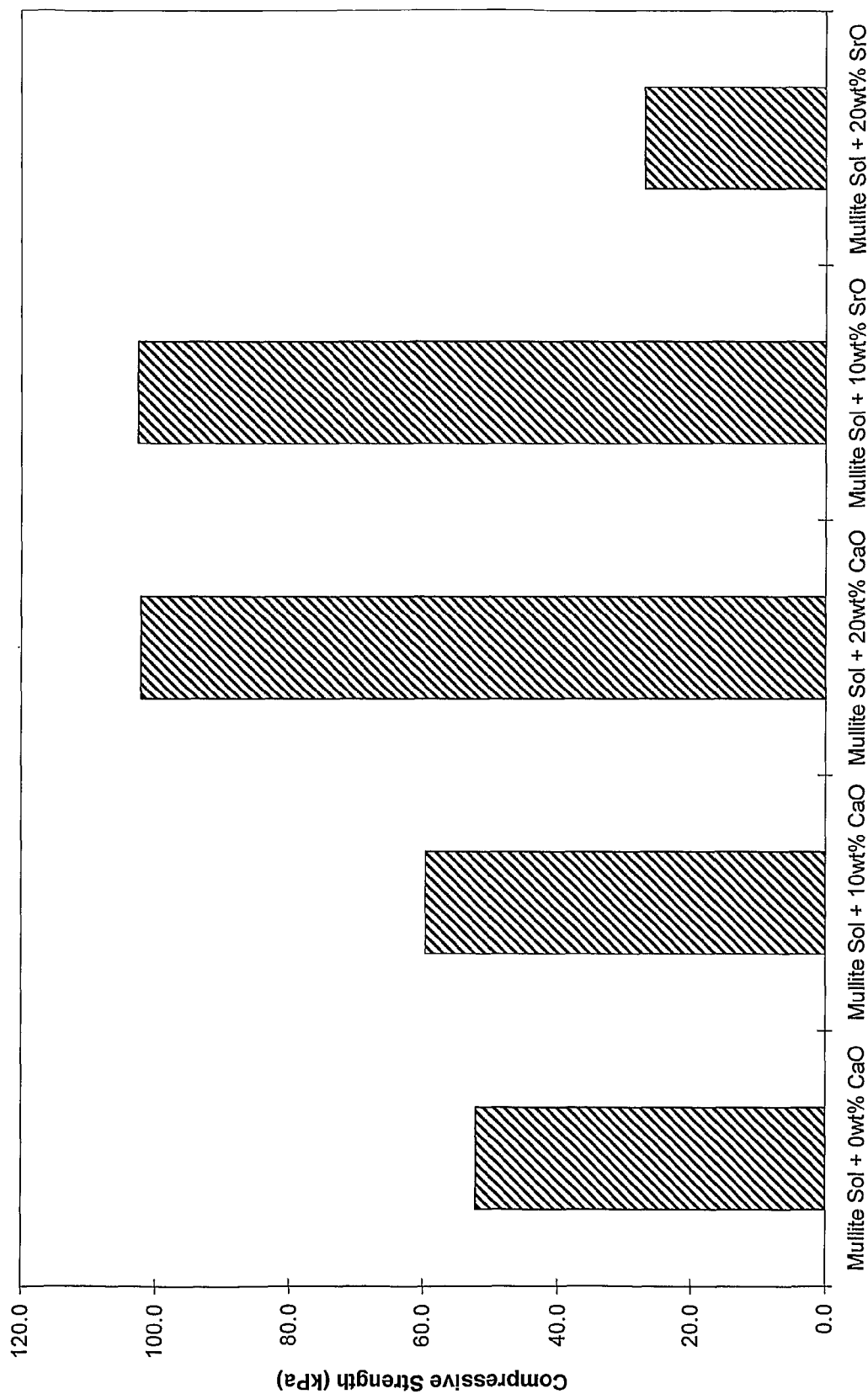
Figure 8:
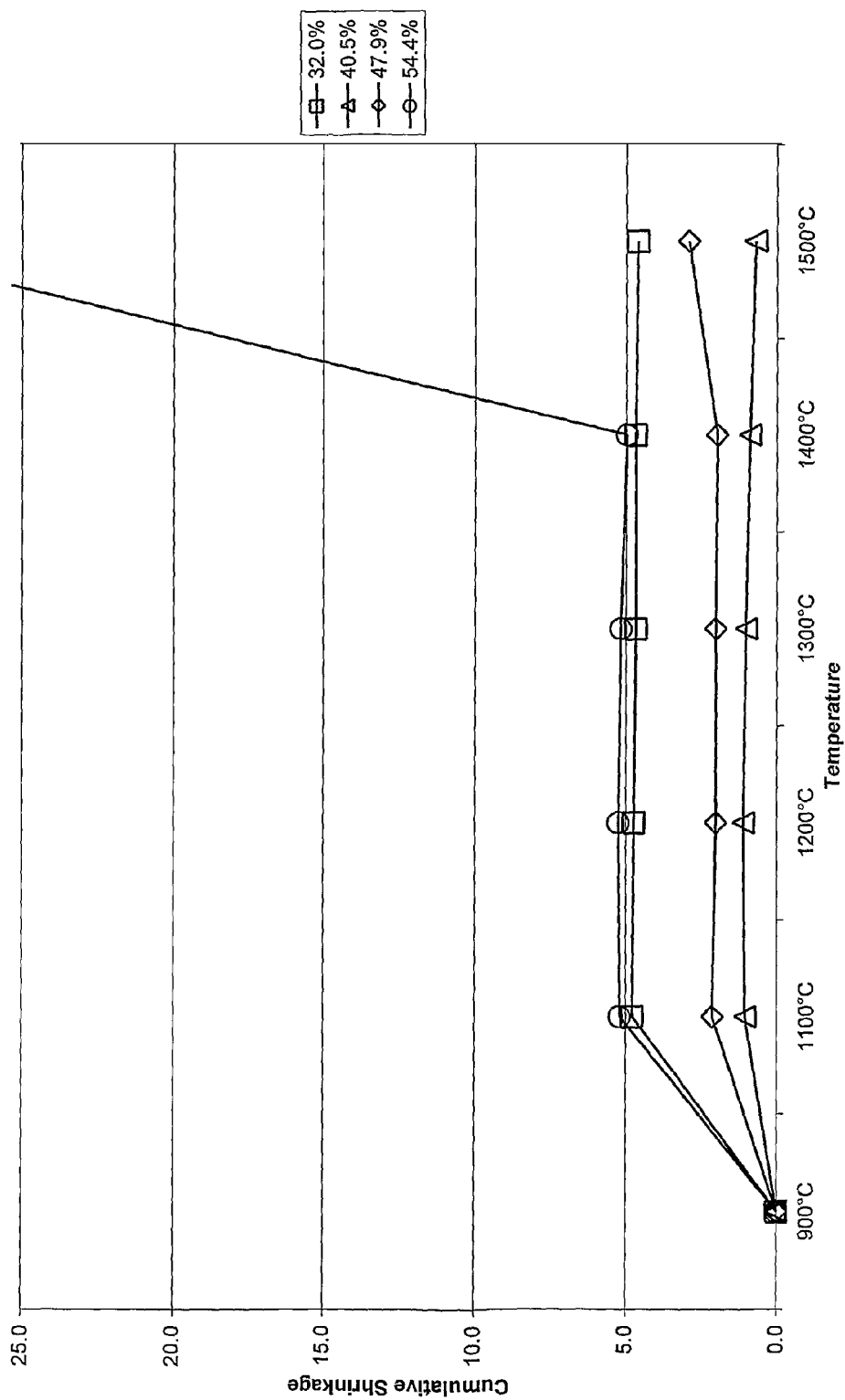

Further features and aspects of the invention will be apparent from the claims and the following illustrative description and in the light of the accompanying drawings in which:

FIG. 1 is a graph of solubilities in body fluids of a range of fibres including fibres according to the invention FIG. 2 is a graph of shrinkage v temperature for a range of MgO modified mullite base composition fibres FIG. 3 is a graph of shrinkage v temperature for a range of CaO modified mullite base composition fibres FIG. 4 is a graph of shrinkage v temperature for a range of SrO modified mullite base composition fibres FIG. 5 is a graph of shrinkage v temperature for a range of CaO and SrO modified mullite base composition fibres FIG. 6 is a graph of shrinkage v temperature for a range of CaO modified alumina base composition fibres FIG. 7 is a graph indicating the compressive strength of mats formed from a range of sol-gel formed fibres of the present invention FIG. 8 is is a graph of shrinkage v temperature for a range of CaO and $SiO_2$ modified mullite base composition fibres.

Figure 9:
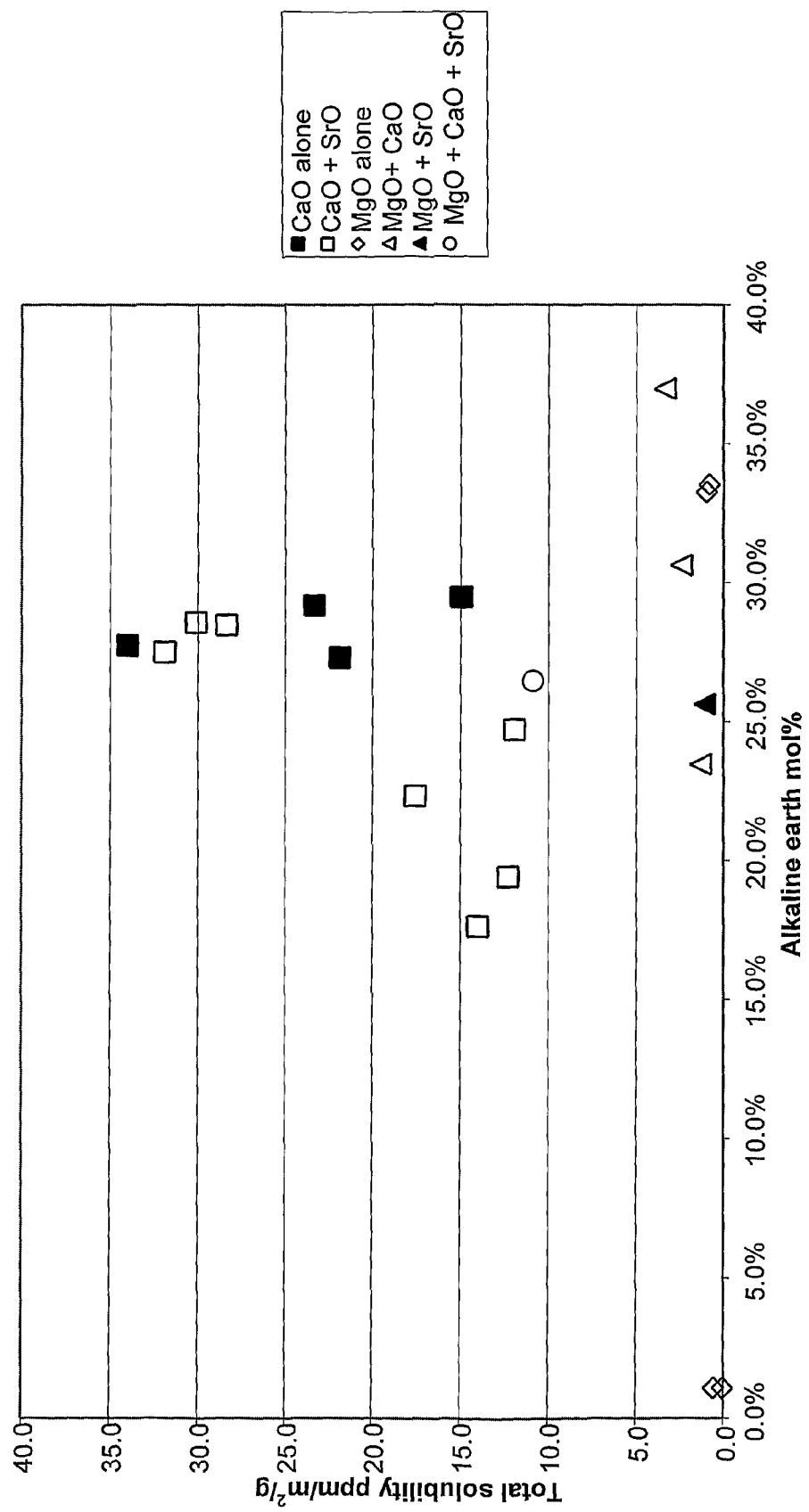
Figure 10:
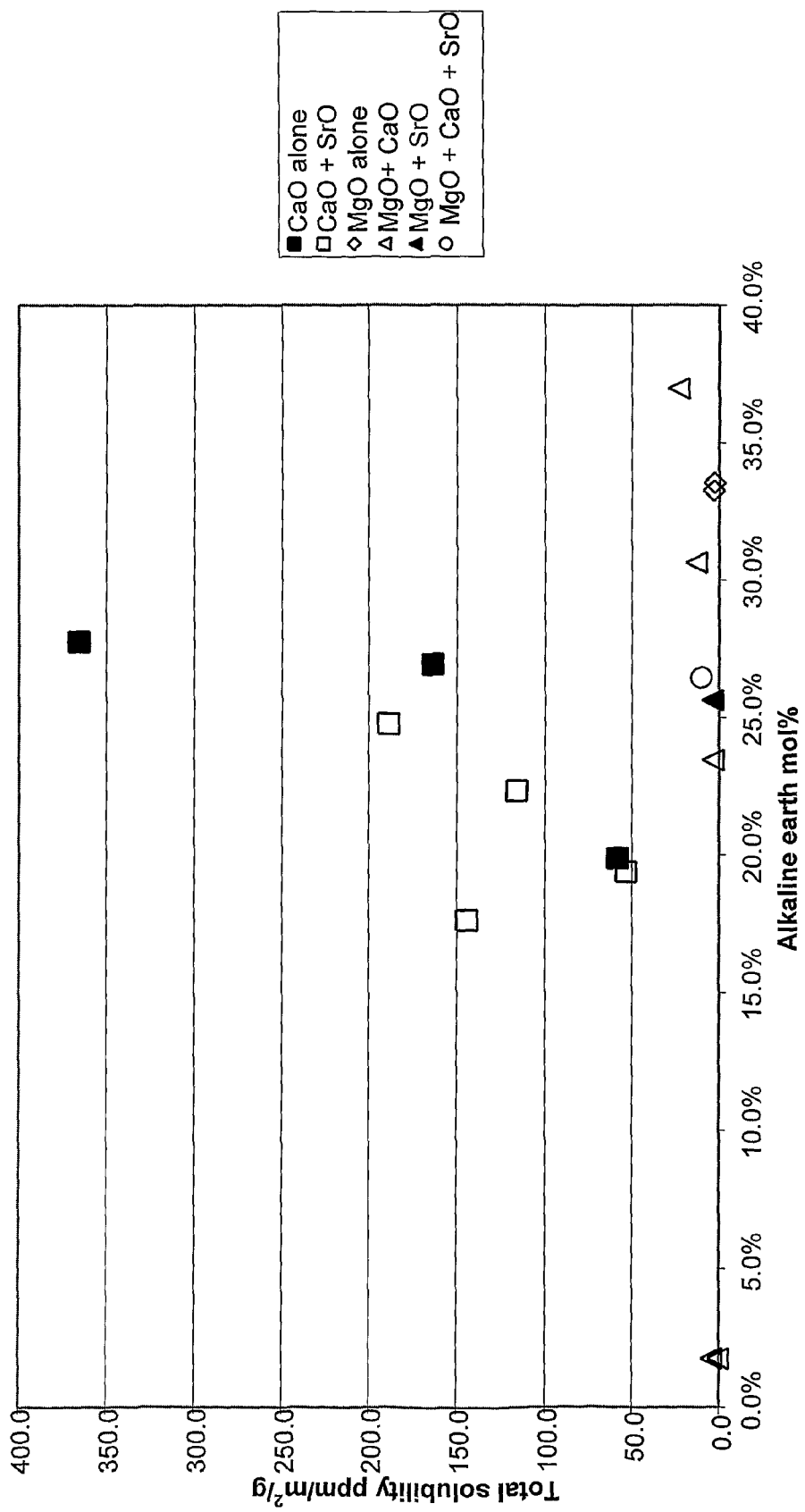

FIG. 9 is a graph of solubility in a pH 7.4 solution v alkaline earth content for a range of fibres FIG. 10 is a graph of solubility in a pH 4.5 solution v alkaline earth content for a range of fibres The fibres of the present invention can be made by conventional sol-gel production processes known in the art including drawing, blowing, tack-spinning, or extrusion of the liquid through a spinneret can be used in the present invention. For example the sol-gel process described in the patent, U.S. Pat. No. 4,348,341 can be used to produce sol-gel formed fibres of the present invention. The present invention lies in the chemistry of the sol and the resultant fibres—not in the specific apparatus used to form fibres from the sol. However use of rotary methods in which a sol is flung from a rotor and then blasted by a gas which acts to dry and gel the sol provides controllable and useful properties in the fibres formed. Rotors may simply be cups with the sol spilling over the edge of the cup, cups with nicked lips so that the sol preferentially passes through the nicks so controlling to some extend fibre diameter, cups or drums with perforations through which the sol is flung, or any of the many known rotary devices.

To prove the concept of the invention, a number of compositions were made by forming various aluminosilicate compositions comprising alkaline earth oxide or alkali metal oxide additives. The precursors used were composed of a base sol to which was added precursors for the desired alkaline earth oxides or alkali metal oxides. Three basic sol compositions were used, two relating to a mullite type composition and the other relating to an alumina type composition.

The base sol chemistries are indicated Table 1 below;

TABLE 1

| Name | % by weight in Recipe | | |
|---|---|---|---|
| | Mullite type composition | Alternate mullite type composition | Alumina type composition |
| Aluminium chlorohydrate solution [50% by weight, made by Reheis, trade name 'Chlorohydrol']. | 40.9 | 72.2 | 85.3 |
| Aluminium chlorohydrate [made by Reheis - trade name 'Microdry'] | 15.4 | 7.34 | 8.2 |
| Polyethylene Oxide [molecular weight ~300,000, made by Dow Chemical Company, trade name 'Polyox WSR N750'] | 0.5 | 0.58 | 2.3 |
| Siloxane [25% silica yield made by Dow Corning - trade name '193 fluid'] | 26.6 | | 4.3 |
| Colloidal silica [a 40% SiO$_2$ yield cationic colloidal silica with a particle size 40 nm, made by Eka Chemicals - trade name is 'Bindzil Cat 80'] | 4.9 | 19.88 | |
| Water | 4.7 | | |
| Viscosity adjustment water | Typically ~7.0 | | |

The aluminium chlorohydrate acts as a source of alumina.

The siloxane and cationic colloidal silica sol act as a source of silica.

The polyethylene oxide is added as a viscosity modifier to the precursor liquid. The viscosity of the liquid precursor needs to be suitable to the fiberising method employed (usually between about 1000 to about 1500 cP at 25° C. for the method used in the examples).

The 'water' in the mullite type recipe is added before the addition of the siloxane, this is to thin the sol a little as the siloxane causes it to thicken. The viscosity adjustment water is added immediately prior to fiberisation to ensure the sol is at the correct viscosity, there is some variation in batch to batch viscosity so the quoted 7.0% is a typical figure.

The alternative mullite recipe avoids the use of siloxane.

The precursors used for the preparation of the base sol for the production of the fibre in the present invention can be accomplished by other conventional methods known in the art. These include the use of inorganic oxy compounds, alkoxides, and chlorides.

Alkaline earth oxides or alkali metal oxides used to alter the properties of the sol-gel formed fibres according to the present invention were included by adding soluble salts in the sol precursor. These include salts such as chlorides or nitrates [e.g. calcium nitrate tetrahydrate, strontium nitrate, magnesium nitrate hexahydrate, potassium chloride].

With high amounts of alkaline earth oxide there can by problems with hygroscopicity of the sol preventing drying and fibre formation. Alkaline earth oxide contents of up to 30 mol % have been readily made with the above ingredients but for higher contents alternative less hygroscopic precursors may be required.

The process used experimentally involved feeding a liquid sol onto a rapidly spinning shallow cup having inclined sides. In the examples given below the majority of runs were carried out at 10,000 rpm. Fiberisation has been demonstrated from 3,000 rpm up to 15,000 rpm. Alternative methods successfully used include:

A spinning disc of a closed cup design with rows of holes around the circumference (typically ~0.5 mm diameter), the sol being fed to the spinner through the shaft.

A fibre blowing system where sol is forced through small orifices (typically ~0.3 mm) using pressure generated using compressed air. Surrounding each orifice is a shroud of air to dry and draw the fibres.

The sol was ejected from the lip of the cup by centrifugal force, forming thin streams of material. As the ejected material left the cup it passed through a stream of hot air which dried and gelled the sol to form an unfired fibre. The temperature of this air was measured using a thermocouple positioned in the hot air flow just above the spinning cup. The air temperature used for the majority of examples was ~60° C. Some sols were fiberised using drying air up to ~80° C. The air temperature needs to be selected to meet the viscosity and drying characteristics of the sol and the additives present. Typically temperatures of 30° C. to 150° C. may be used as appropriate. Any other suitable means for drying the fibre may be employed, for example, by circulating dehumidified air or gas around the fibre.

The fibres were collected in alumina kiln trays and heat treated by placing the tray in a kiln and firing in the following stages: 80° C./1 hr, 350° C./1 hr, 900° C./1 hr [except where a different temperature is indicated below]. This firing regime is not critical to producing a fibre and the regime adopted needs to provide sufficient time and temperature to achieve the aim of removing all organic components and oxidising the inorganic components. The heating temperature is preferably between about 700° C. and about 2000° C. and more preferably between about 850° C. and about 1500° C. The heating time may be in excess of about 15 minutes and is typically in excess of about 1 hour.

TABLE 2

| Sample Number | Measured (wt %) | | | | | | Calculated Mol % | | | | | |
|---|---|---|---|---|---|---|---|---|---|---|---|---|
| | Al$_2$O$_3$ | SiO$_2$ | K$_2$O | CaO | MgO | SrO | Al$_2$O$_3$ | SiO$_2$ | K$_2$O | CaO | MgO | SrO |
| 0125 | 73.0 | 27.1 | | 0 | | | 61.3% | 38.7% | | | | |
| 0135 | 71.5 | 27.4 | | 1.2 | | | 59.6% | 38.7% | | 1.7% | | |
| 0126 | 69.9 | 24.6 | | 5.2 | | | 57.8% | 34.5% | | 7.7% | | |
| 0127 | 66.9 | 23.6 | | 9.9 | | | 53.6% | 32.0% | | 14.4% | | |
| 0128 | 61.2 | 20.8 | | 17.9 | | | 47.4% | 27.4% | | 25.2% | | |
| 0129 | 56.5 | 18.2 | | 25.2 | | | 42.4% | 23.2% | | 34.3% | | |
| 0134 | 72.7 | 26.0 | 1.2 | | | | 61.5% | 37.4% | 1.1% | | | |
| 0130 | 67.9 | 27.0 | 5.0 | | | | 57.0% | 38.5% | 4.5% | | | |

TABLE 2-continued

| | Measured (wt %) | | | | | | Calculated Mol % | | | | | |
|---|---|---|---|---|---|---|---|---|---|---|---|---|
| Sample Number | $Al_2O_3$ | $SiO_2$ | $K_2O$ | CaO | MgO | SrO | $Al_2O_3$ | $SiO_2$ | $K_2O$ | CaO | MgO | SrO |
| 0131 | 64.8 | 25.2 | 8.8 | | | | 55.3% | 36.5% | 8.2% | | | |
| 0133 | 64.1 | 23.4 | 10.6 | | | | 55.6% | 34.4% | 10.0% | | | |
| 0132 | 62.4 | 24.6 | 12.2 | | | | 53.2% | 35.6% | 11.3% | | | |
| 0223 | 72.7 | 25.6 | | | 1.1 | | 61.1% | 36.6% | | | 2.3% | |
| 0224 | 70.0 | 25.2 | | | 5.1 | | 55.7% | 34.0% | | | 10.2% | |
| 0225 | 66.2 | 22.9 | | | 10.3 | | 50.5% | 29.6% | | | 19.9% | |
| 0274 | 72.7 | 26.2 | | | | 1.2 | 61.5% | 37.6% | | | | 1.0% |
| 0275 | 67.8 | 26.5 | | | | 5.7 | 57.3% | 38.0% | | | | 4.7% |
| 0276 | 64.5 | 25.0 | | | | 10.4 | 55.1% | 36.2% | | | | 8.8% |
| 0277 | 56.9 | 22.1 | | | | 21.1 | 49.4% | 32.6% | | | | 18.0% |
| 0278 | 49.5 | 18.8 | | | | 31.0 | 44.2% | 28.5% | | | | 27.3% |
| 0448 | 75 | 25.1 | | 0.7 | | 0.6 | 62.8% | 35.7% | | 1.1% | | 0.5% |
| 0437 | 70.3 | 24.6 | | 2.7 | | 2.6 | 58.8% | 34.9% | | 4.1% | | 2.1% |
| 0410 | 65.8 | 23.8 | | 5.3 | | 5.3 | 54.4% | 33.4% | | 8.0% | | 4.3% |
| 0429 | 58.3 | 19.2 | | 11.3 | | 11.5 | 47.5% | 26.5% | | 16.7% | | 9.2% |
| 0428 | 49.55 | 17.13 | | 16.39 | | 16.49 | 39.8% | 23.3% | | 23.9% | | 13.0% |
| 0301 | 95.1 | 4.1 | | 0.1 | | | 93.0% | 6.8% | | 0.2% | | |
| 0295 | 94.4 | 4.0 | | 1.0 | | | 91.6% | 6.6% | | 1.8% | | |
| 0296 | 90.8 | 3.7 | | 5.4 | | | 85.0% | 5.9% | | 9.1% | | |
| 0297 | 87.5 | 3.0 | | 10.4 | | | 78.5% | 4.6% | | 16.9% | | |
| 0298 | 82.3 | 3.7 | | 14.8 | | | 71.2% | 5.4% | | 23.3% | | |
| 0299 | 74.0 | 2.7 | | 22.8 | | | 61.7% | 3.8% | | 34.5% | | |
| 0537 | 56.2 | 30.7 | | 11.2 | | | 43.6% | 40.5% | | 15.9% | | |
| 0538 | 50.6 | 38.2 | | 11.0 | | | 37.4% | 47.9% | | 14.7% | | |
| 0539 | 44.6 | 45.2 | | 10.8 | | | 31.7% | 54.4% | | 13.9% | | |
| 0564 | 88.8 | 0.2 | | 10.1 | | | 82.6% | 0.3% | | 17.0% | | |
| 0565 | 99.2 | 0.3 | | | | | 99.5% | 0.5% | | | | |
| 0566 | 82.4 | 6.4 | | 10.7 | | | 73.2% | 9.6% | | 17.2% | | |
| 0567 | 72.0 | 16.5 | | 10.6 | | | 60.3% | 23.5% | | 16.1% | | |

TABLE 3

| | Normalised Static Solubility ($ppm/m^2/g$) - 1100° C. | | | | | | Normalised Static Solubility - 900° C. | | | | |
|---|---|---|---|---|---|---|---|---|---|---|---|
| Sample Number | $Al_2O_3$ | $SiO_2$ | CaO | MgO | SrO | Total | $Al_2O_3$ | $SiO_2$ | $K_2O$ | CaO | Total |
| 0125 | 0 | 0.4 | 0 | | | 0.4 | 0.0 | 0.0 | 0.0 | 0.0 | 0.0 |
| 0135 | 0.0 | 0.0 | 0.0 | | | 0 | 0.0 | 0.0 | 0.0 | 0.1 | 0.1 |
| 0126 | 1.8 | 3.0 | 3.9 | | | 8.7 | 0.0 | 0.0 | 0.0 | 0.4 | 0.4 |
| 0127 | 2.1 | 8.3 | 6.2 | | | 16.7 | 11.1 | 7.1 | 0.0 | 2.0 | 20.2 |
| 0128 | 16.2 | 13.0 | 24.7 | | | 53.9 | 10.8 | 13.0 | 0.0 | 15.8 | 39.5 |
| 0129 | 10.1 | 9.8 | 19.3 | | | 39.3 | 20.5 | 21.5 | 0.0 | 34.5 | 76.5 |
| 0134 | | | | | | | 0.0 | 0.0 | 0.7 | 0.0 | 0.7 |
| 0130 | | | | | | | 0.0 | 0.0 | 2.1 | 0.0 | 2.1 |
| 0131 | | | | | | | 0.1 | 0.0 | 3.9 | 0.0 | 4.0 |
| 0133 | | | | | | | 0.5 | 0.0 | 9.4 | 0.0 | 10.0 |
| 0132 | | | | | | | 0.3 | 0.0 | 13.1 | 0.0 | 13.4 |
| 0223 | 0.0 | 0.4 | | 0.1 | | 0.6 | | | | | |
| 0224 | 0.1 | 1.0 | | 0.3 | | 1.5 | | | | | |
| 0225 | 0.1 | 3.3 | | 0.7 | | 4.0 | | | | | |
| 0274 | 0.0 | 0.7 | | | 0.3 | 0.9 | | | | | |
| 0275 | 1.1 | 2.2 | | | 1.2 | 4.5 | | | | | |
| 0276 | 1.2 | 0.8 | | | 0.9 | 2.8 | | | | | |
| 0277 | 4.9 | 2.6 | | | 4.2 | 11.7 | | | | | |
| 0278 | 12.8 | 12.1 | | | 30.6 | 55.5 | | | | | |
| 0301 | 0.0 | 0.1 | 0.0 | | | 0.1 | | | | | |
| 0295 | 0.2 | 0.7 | 2.5 | | | 3.4 | | | | | |
| 0296 | 0.1 | 0.3 | 3.0 | | | 3.3 | | | | | |
| 0297 | 0.6 | 1.1 | 5.4 | | | 7.1 | | | | | |
| 0298 | 3.7 | 2.4 | 5.4 | | | 11.4 | | | | | |
| 0299 | 3.3 | 4.3 | 8.5 | | | 16.1 | | | | | |
| 0448 | 0.0 | 0.35 | 0.18 | | 0.13 | 0.7 | | | | | |
| 0437 | 1.0 | 3.3 | 8.9 | | 0.8 | 14.0 | | | | | |
| 0410 | 0.3 | 3.7 | 6.3 | | 1.1 | 11.3 | | | | | |
| 0429 | 0.8 | 18.2 | 54.2 | | 18.2 | 91.3 | | | | | |
| 0428 | 1.7 | 7.3 | 12.9 | | 5.7 | 27.7 | | | | | |
| 0537 | 1.8 | 3.5 | 2.9 | | | 8.2 | | | | | |
| 0538 | 0.5 | 6.5 | 2.4 | | | 9.4 | | | | | |
| 0539 | 0.6 | 2.8 | 1.3 | | | 4.7 | | | | | |
| 0564 | 0.0 | 0.1 | 1.5 | | | 1.6 | | | | | |

TABLE 3-continued

| | Normalised Static Solubility (ppm/m²/g) - 1100° C. | | | | | | Normalised Static Solubility - 900° C. | | | | |
|---|---|---|---|---|---|---|---|---|---|---|---|
| Sample Number | Al₂O₃ | SiO₂ | CaO | MgO | SrO | Total | Al₂O₃ | SiO₂ | K₂O | CaO | Total |
| 0565 | 0.0 | 0.0 | 0.1 | | | 0.2 | | | | | |
| 0566 | 0.0 | 1.9 | 6.5 | | | 8.4 | | | | | |
| 0567 | 0.0 | 2.0 | 5.4 | | | 7.4 | | | | | |

Table 2 shows the range of compositions tested. Table 3 and FIG. 1 show normalised static solubilities in body fluids found for some of these compositions. The solubilities were measured either on fibres that had been fired at 900° C., or that had been re-fired at 1100° C. as indicated. Typical fibre diameters for these fibres varied in accordance with rotor speed, with fibres having a length weighted geometric mean diameter of ~3.4 μm at a 10,000 rpm rotor speed to ~4.7 μm at a 5,000 rpm rotor speed. Rotor speed thus gives a means of tailoring fibre diameters with fibre diameter being inversely related to rotor speed. The fibres produced for these examples had a range of fibre lengths with typical fibres having lengths in the range 200 μm to 5 cm, giving a typical aspect ratio in the range ~40:1 to ~10,000:1. The applicants are confident that optimisation of parameters will enable the consistent manufacture of fibres having lengths >1 cm.

Normalised static solubility was obtained by measuring the amount of dissolution of the fibres in a physiological saline solution held at body temperature [37° C.±1° C.] for a period of 24 hours and dividing the dissolved components in the saline solution by the total surface area of the fibres.

A detailed procedure to measure solubility comprises weighing 0.500 g±0.003 g of fibre into a centrifuge tube using plastic tweezers. The fibre is usually chopped (6# wire mesh) and deshotted (hand sieved with 10# wire), but may be bulk or blanket if only small amounts of fibre are available. Each sample is weighed out in duplicate. 25 cm³ of simulated body fluid is poured into each centrifuge tube using the graduated dispenser and the tubes sealed. The simulated body fluid is only added to the fibre at the start of the test.

A pH ~7.4 simulated body fluid solution is typically made up by:

washing out a 4 liter container with fresh distilled water.

adding 2 liters of distilled water at ~25° C. to the container and adding the following reagents in order. (Weights accurate to ±0.001 g)

| Reagent | Weight |
|---|---|
| Sodium Chloride (NaCl) | 27.120 g |
| Sodium Hydrogen Carbonate (NaHCO₃) | 9.072 g |
| Ammonium Chloride (NH₄Cl) | 2.140 g |
| Sodium Citrate Dihydrate (Na₃C₆H₅O₇·2H₂O) | 0.236 g |
| Glycine (H₂NCH₂CO₂H) | 1.800 g |
| Di-Sodium Hydrogen Orthophosphate Anhydrous (Na₂HPO₄) | 0.684 g |
| Sulphuric Acid (10 w/w solution) | 1.960 g |
| Formaldehyde | 10 ml | making up to 4 liters with distilled water and leaving for 24 hrs prior to use checking the pH of the solution before use and only using if within range [pH should read 7.4-7.5].

A pH ~4.5 simulated body fluid solution comprises the following ingredients in 10 liters of water.

| Reagent | Weight |
|---|---|
| NaHCO₃ | 19.5 g |
| CaCl₂·2H₂O | 0.29 g |
| Na₂HPO₄ | 1.48 g |
| Na₂SO₄ | 0.79 g |
| MgCl₂·6H₂O | 2.12 |
| Glycine (H₂NCH₂CO₂H) | 1.18 g |
| Na₃citrate·2H₂O | 1.52 g |
| Na₃tartrate·2H₂O | 1.8 g |
| Na pyruvate | 1.72 g |
| 90% lactic acid | 1.56 g |
| Formaldehyde | 15 ml |
| HCl | ~7.5 ml | with the HCl added slowly, as this is an approximate figure for pH adjustment to a final figure of ~4.5 pH.

All of the reagents used are of Analar or equivalent grade and the procedure is carried out using plastic equipment as silica leaching may occur from glassware.

The centrifuge tubes are then placed in a shaking water bath, which is held at 37° C.±1° C. (body temperature) and shaken for 24 hrs.

After shaking the two solutions for each fibre are decanted and filtered through Whatman, 110 mm diameter no. 40 ashless filter papers into one 50 ml bottle. The solution is then submitted for Inductively Coupled Plasma Atomic Emission Spectroscopy (ICP). The oxides tested for will depend on the composition of the fibre being tested. The results are reported as ppm of the relevant oxide.

The specific surface area is measured using a Micromeritics Tristar surface area analyser by the BET method which is based on the property of a solid to absorb gas molecules on their surface. In the range, 0.5 to 0.3 times the saturated vapour pressure of the measuring gas multi-layer adsorption begins. The formation of the first monolayer can be detected from the behaviour of the adsorption isotherm in this range.

The volume of gas adsorbed is measured at defined pressures and the Brunneur, Emmett and Teller equation (BET) is used to calculate the surface area. To obtain most reproducible results the fibres exposed to heat at a temperature at least 50° C. below which any material weight loss or morphological changes takes place. Typically for the fibres of the invention much temperatures are used [e.g. 350° C.] since the purpose is to remove any liquid or adsorbed gasses from the surface of the sample.

As can be seen from Table 3 and FIG. 1, both the unmodified alumina and unmodified mullite type fibres had effectively zero solubility, but as the amount of alkali metal oxide or alkaline earth oxide was increased—so too the solubility increased. For the modified mullite modified with CaO and fired at 1100° C. the solubility increased to a maximum at about 25 mol % and a similar pattern was shown by compositions comprising a mixture of CaO and SrO. The mixture of CaO and SrO at a level of ~25 mol % gave the highest solubility.

Solubility depends of course on the environment within which a fibre finds itself. Although the physiological saline solution present in intercellular lung fluid approximates to that given above, and has a pH of around pH 7.4, the mechanism for clearing fibres involves their attach be macrophages. It is known that the pH of the physiological saline present where the macrophages contact fibres is significantly lower (around pH 4.5) and this has an effect on solubility of inorganic fibres [see "*In-vitro dissolution rate of mineral fibres at pH 4.5 and 7.4—A new mathematical tool to evaluate the dependency an composition*" Torben Knudsen and Marrianne Guldberg, Glass Sci. Technol. 78(205) No. 3]. Whereas at pH 7.4 the effect of alumina in is to decrease solubility, at ph 4.5 it is the reverse. Accordingly, the applicants produced some CaO containing fibres based on the mullite chemistry that were fired at 1100° C. [a "commercial" range firing temperature aimed at producing crystalline fibres] and compared these with commercial Saffi® and Maftec® fibres for solubility at pH 7.4 and 4.5. The results are in Table 4 below and show that the fibres of the invention have very much higher solubility than the commercial fibres at both low and neutral pH.

TABLE 4

| Composition | Normalised static solubility (ppm/m$^2$/g) | |
| --- | --- | --- |
| | pH 7.4 | pH 4.5 |
| 46 mol % Al$_2$O$_3$/29.4 mol % SiO$_2$/24.6 mol % CaO | 53.89 | 168.62 |
| 42.4 mol % Al$_2$O$_3$/23.2 mol % SiO$_2$/34.4 mol % CaO | 39.28 | 118.13 |
| Saffil ® LD mat | 1.67 | 3.80 |
| Maftec ® Autowrap | 1.62 | 1.47 |
| Maftec ® Blanket | 0.99 | 2.46 |

It can be seen from FIG. 1 that the compositions including MgO as an additive showed the lowest increase in solubility. The applicant conducted comparative solubility tests on materials as set out in Table 6 to determine the effect of mixed alkaline earth additions using MgO as one of the alkaline earth components. Compositions 1264 and 1263 refer respectively to an example to the composition of Example 8 of U.S. Pat. No. 3,982,955 as fired at 1400° C. under nitrogen in that patent, and the same composition as fired for four hours in air at 900° C. These compositions were made from the starting materials:

Aluminium chlorohydrate 50% solution 16960 g

Aluminium chlorohydrate powder 1072 g

Siloxane 2808 g

Magnesium nitrate hexahydrate 160 g

PolyoxN750 120 g

The remaining examples were fired in air for 1 hour at 1100° C. The solubility results are set out in Table 7 and in FIGS. 9 and 10 which show, respectively, solubilities in ph 7.4 solution and pH 4.5 solution.

It is readily apparent that the solubility of materials containing magnesium oxide [compositions 1113 and below] are significantly below those which do not contain magnesium oxide but other alkaline earth metal oxides. The comparative examples 1263 and 1264 show extremely low solubility. FIG. 9 shows that at pH 7.4 the only magnesium containing sample that has a solubility comparable to materials containing CaO and/or SrO alone is that comprising CaO, SrO, and MgO. FIG. 10 shows that in pH 4.5 solution solubilities are considerable higher than in pH 7.4 solution, and that none of the magnesium containing materials has a solubility approaching that of the magnesium free materials.

TABLE 6

| Sample Number | Measured (wt %) | | | | | Calculated Mol % | | | | |
| --- | --- | --- | --- | --- | --- | --- | --- | --- | --- | --- |
| | Al$_2$O$_3$ | SiO$_2$ | CaO | MgO | SrO | Al$_2$O$_3$ | SiO$_2$ | CaO | MgO | SrO |
| 0605 | 67.8 | 12.8 | 20.3 | | | 53.6 | 17.2 | 29.2 | | |
| 0659 | 61.1 | 22.6 | 16.5 | | | 47.2 | 29.6 | 23.2 | | |
| 0708 | 60.8 | 22.0 | 8.6 | | 8.1 | 50.0 | 30.7 | 12.8 | | 6.5 |
| 0709 | 62.3 | 22.5 | 7.6 | | 7.8 | 51.0 | 31.4 | 11.3 | | 6.3 |
| 0710 | 62.2 | 23.8 | 14.0 | | | 48.6 | 31.5 | 19.9 | | |
| 0711 | 58.8 | 21.1 | 9.7 | | 9.7 | 48.3 | 29.4 | 14.5 | | 7.8 |
| 0741 | 60.4 | 21.1 | 19.5 | | | 45.9 | 27.2 | 26.9 | | |
| 0770 | 56.8 | 22.0 | 11.0 | | 11.2 | 45.4 | 29.9 | 15.9 | | 8.8 |
| 0783 | 56.8 | 22.0 | 11.0 | | 11.2 | 45.4 | 29.8 | 16.0 | | 8.8 |
| 0935 | 61.3 | 22.2 | 15.7 | | | 48.1 | 29.6 | 22.3 | | |
| 0936 | 59.9 | 20.6 | 19.6 | | | 45.9 | 26.8 | 27.3 | | |
| 0937 | 58.3 | 19.7 | 21.1 | | | 44.8 | 25.7 | 29.5 | | |
| 0974 | 58.2 | 19.4 | 18.0 | | 3.6 | 45.7 | 25.8 | 25.7 | | 2.8 |
| 0975 | 57.2 | 20.5 | 15.4 | | 7.0 | 45.1 | 27.4 | 22.1 | | 5.4 |
| 0976 | 56.3 | 18.8 | 13.6 | | 10.8 | 45.6 | 25.9 | 19.9 | | 8.6 |
| 1057 | 58.0 | 24.6 | 16.8 | | | 44.6 | 32.0 | 23.5 | | |
| 1058 | 59.6 | 22.6 | 17.7 | | | 45.8 | 29.4 | 24.7 | | |
| 1059 | 57.7 | 22.0 | 20.1 | | | 43.9 | 28.4 | 27.7 | | |
| 1113 | 62.0 | 24.2 | 7.4 | 7.2 | | 46.0 | 30.5 | 10.0 | 13.5 | |
| 1114 | 57.4 | 23.0 | 10.1 | 9.6 | | 41.3 | 28.1 | 13.1 | 17.5 | |
| 1115 | 54.4 | 21.8 | 12.7 | 12.1 | | 37.5 | 25.5 | 15.9 | 21.1 | |
| 1166 | 58.9 | 21.7 | | 18.9 | | 41.0 | 25.7 | | 33.3 | |
| 1167 | 58.8 | 21.6 | | 19.0 | | 40.9 | 25.5 | | 33.5 | |
| 1168 | 58.8 | 22.1 | | 9.4 | 9.5 | 45.4 | 28.9 | | 18.4 | 7.2 |
| 1169 | 58.3 | 21.8 | 6.4 | 6.4 | 6.6 | 45.0 | 28.5 | 9.0 | 12.5 | 5.0 |
| 1263 | 87.3 | 10.2 | | 0.5 | | 82.5 | 16.4 | | 1.1 | |
| 1264 | 87.3 | 10.2 | | 0.5 | | 82.5 | 16.4 | | 1.1 | |

It thus appears that while minor amounts of MgO might be tolerated best results are achieved when the amount of MgO is small, below 50%, more preferably below 25%, and still more preferably below 10% of the amount of alkaline earth oxide present. The MgO containing materials all appear to contain MgAl₂O₄ (spinel) and this may cause the low solubility shown.

TABLE 7

| Sample Number | Measured solubility at pH ~7.4 (ppm)/ surface area (m²/g) | | | | | Measured solubility at pH ~4.5 (ppm)/ surface area (m²/g) | | | | |
|---|---|---|---|---|---|---|---|---|---|---|
| | Al₂O₃ | SiO₂ | CaO | MgO | SrO | Al₂O₃ | SiO₂ | CaO | MgO | SrO |
| 0605 | 0.9 | 5.7 | 16.7 | | | Not measured | | | | |
| 0659 | 0.9 | 4.8 | 10.5 | | | Not measured | | | | |
| 0708 | 0.1 | 5.7 | 4.5 | | 2.1 | 22.8 | 19.3 | | | 11.2 |
| 0709 | 0.0 | 4.7 | 6.1 | | 3.2 | 24.0 | 108.3 | | | 12.1 |
| 0710 | 0.0 | 4.3 | 7.0 | 0.0 | | 27.8 | 30.4 | | | 0.2 |
| 0711 | 0.0 | 5.4 | 9.0 | | 3.2 | 51.5 | 41.2 | | | 23.1 |
| 0741 | 0.2 | 5.9 | 10.9 | | | 98.1 | 65.3 | | | 0.0 |
| 0770 | 0.7 | 3.3 | 4.9 | | 3.0 | Not measured | | | | |
| 0935 | 0.3 | 2.2 | 2.9 | 0.0 | | Not measured | | | | |
| 0936 | 11.6 | 3.4 | 6.9 | 0.0 | | Not measured | | | | |
| 0937 | 2.1 | 3.9 | 9.0 | 0.0 | | Not measured | | | | |
| 0974 | 6.6 | 6.6 | 13.3 | | 1.8 | Not measured | | | | |
| 0975 | 7.0 | 6.8 | 14.2 | | 3.9 | Not measured | | | | |
| 0976 | 6.3 | 5.7 | 12.3 | | 5.7 | Not measured | | | | |
| 1057 | 3.6 | 3.8 | 8.1 | | | Not measured | | | | |
| 1058 | 9.5 | 9.7 | 13.9 | | | Not measured | | | | |
| 1059 | 9.3 | 8.2 | 16.6 | | | 138.8 | 109.4 | 117.4 | | |
| 1113 | 0.1 | 0.2 | 0.7 | 0.3 | | 1.3 | 0.9 | 1.0 | 0.3 | |
| 1114 | 0.2 | 0.2 | 1.9 | 0.1 | | 3.1 | 3.2 | 6.5 | 0.2 | |
| 1115 | 0.3 | 0.9 | 2.0 | 0.1 | | 5.8 | 7.6 | 9.3 | 0.5 | |
| 1166 | 0.0 | 0.4 | | 0.5 | | 1.0 | 1.2 | | 1.0 | |
| 1167 | 0.0 | 0.3 | | 0.5 | | 0.7 | 0.9 | | 1.0 | |
| 1168 | 0.0 | 0.2 | | 0.2 | 0.7 | 0.3 | 0.4 | | 0.3 | 3.0 |
| 1169 | 0.7 | 1.1 | 3.7 | 3.7 | 1.7 | 0.7 | 1.5 | 5.2 | 0.0 | 2.6 |
| 1263 | Not measured | | | | | 0.1 | 0.2 | | 0.2 | |
| 1264 | 0.1 | 0.3 | 0.0 | 0.2 | 0.0 | 2.0 | 1.5 | | 0.9 | |

While static solubilities are only indicative of biopersistence, these results are strong support for the premise that if inhaled the fibres of the invention would not persist as long as commercial alumina and mullite fibres.

The refractory properties of some of the fibres of Table 2, fired at 900° C., were examined by successively exposing the fibres to temperatures at intervals of 100° C. from 1100° C. to 1500° C., and these are indicated in Table 5 and in FIGS. 2 to 6 and 8.

TABLE 5

| Sample Number | Cumulative shrinkage after 1 hour exposure to | | | | |
|---|---|---|---|---|---|
| | 1100° C. | 1200° C. | 1300° C. | 1400° C. | 1500° C. |
| 0125 | 10.1 | 11.7 | 12.3 | 14.4 | 15.5 |
| 0135 | 12.1 | 12.4 | 12.8 | 12.8 | 11.8 |
| 0126 | 14.6 | 14.5 | 14.2 | 13.9 | 14.7 |
| 0127 | 4.8 | 4.7 | 4.7 | 4.7 | 4.6 |
| 0128 | 1.7 | 2.0 | 2.3 | 10.4 | 54.7 |
| 0223 | 11.9 | 12.9 | 13.1 | 13.1 | 12.6 |
| 0224 | 5.6 | 6.2 | 6.5 | 6.6 | 8.7 |
| 0225 | −0.2 | 0.7 | 0.8 | 1.7 | 5.0 |
| 0274 | 13.0 | 13.1 | 14.7 | 15.3 | 15.6 |
| 0275 | 12.9 | 12.3 | 12.6 | 12.6 | 12.4 |
| 0276 | 12.8 | 12.3 | 12.1 | 11.3 | 11.8 |
| 0277 | 2.1 | 2.3 | 2.9 | 3.1 | 3.1 |
| 0278 | 6.8 | 7.4 | 7.4 | 7.1 | 7.5 |
| 0448 | 9.5 | 9.9 | 9.8 | 10.0 | 10.2 |
| 0437 | 13.7 | 13.4 | 13.4 | 12.9 | 12.1 |
| 0410 | 4.6 | 4.7 | 4.5 | 4.6 | 4.6 |

TABLE 5-continued

| Sample Number | Cumulative shrinkage after 1 hour exposure to | | | | |
|---|---|---|---|---|---|
| | 1100° C. | 1200° C. | 1300° C. | 1400° C. | 1500° C. |
| 0429 | 1.2 | 1.8 | 1.8 | 9.4 | 41.1 |
| 0301 | 1.5 | 1.4 | 4.8 | 13.0 | 13.7 |
| 0295 | 1.0 | 4.2 | 10.2 | 10.5 | 11.3 |
| 0296 | 2.1 | 6.6 | 7.5 | 6.5 | 11.2 |
| 0297 | 4.7 | 5.8 | 6.0 | 5.6 | 9.0 |
| 0298 | 4.3 | 4.0 | 3.7 | 5.7 | 12.3 |
| 0299 | 1.6 | 1.7 | 2.1 | 3.0 | 10.5 |
| 0537 | 1.1 | 1.1 | 1.0 | 0.9 | 0.7 |
| 0538 | 2.1 | 2.0 | 2.0 | 2.0 | 2.9 |
| 0539 | 5.2 | 5.2 | 5.2 | 5.0 | 31.4 |
| 0564 | 1.4 | 2.5 | 4.1 | 6.0 | 6.9 |
| 0565 | 1.6 | 2.0 | 2.6 | 2.9 | 4.4 |
| 0566 | 1.5 | 3.0 | 3.2 | 6.4 | 38.2 |
| 0567 | 3.8 | 6.6 | 7.0 | 9.3 | 23.7 |

[Additional tests of some fibres for 24 hour shrinkage at these temperatures did not reveal any significant differences from these 1 hour tests].

FIG. 2 shows the effect of MgO addition to a base mullite composition. As can be seen from Table 5 and FIG. 2, at small quantities MgO has relatively little effect on shrinkage in comparison with an unmodified mullite based fibre, but at higher quantities shows a lower shrinkage, and more importantly a lower slope in shrinkage. This is indicative that a firing temperature of 900° C. is too low for such materials and a higher firing temperature (e.g. 1000° C.-1100° C.) may be required in production. For higher MgO contents the shrinkage is significantly lower than for the unmodified material, but shows signs of increasing at 1500° C.

In FIG. 3, the effect of CaO addition on a mullite based composition is shown. While lower additive levels do not appear that different from those shown by MgO as an additive the high addition of ~25 mol % shows a very high growth in shrinkage at 1400° C. The fibre with 14.4 mol % CaO has an effectively uniform shrinkage from 1000° C. to 1500° C.

In FIG. 4, the effect of SrO addition on a mullite based composition is shown. A similar picture applies but the SrO appears to be suppressing the increase in shrinkage at 1500° C. for the high addition fibres.

In FIG. 5, the effect of combined CaO and SrO addition on a mullite based composition is shown and indicates that mixture of alkaline earth oxides is not deleterious to shrinkage but again shows that high levels [>~25 mol %] shows a very high growth in shrinkage at 1400° C. Fibres having such high alkaline earth oxide additions may still be of use at lower temperatures in view of their high solubility.

In FIG. 6, the effect of CaO addition on an alumina based composition is shown. As can be seen the effect is mixed, but at temperatures of 1400° C. or above lower shrinkages are shown and there is a lower slope of shrinkage above 1100° C. indicating that a higher firing temperature for the fibre may provide superior shrinkage properties to an unmodified alumina fibre.

In FIG. 8 the effect of $SiO_2$ addition to a material comprising roughly constant amounts of CaO [13.9 mol % to 15.9 mol %] is illustrated. As can be seen the fibres show relatively uniform shrinkage from 1100° C. to 1500° C. except for the highest silica content fibre [54.4 mol % silica—composition 539 above] which shows an increase in shrinkage above 1400° C. For this limited range of CaO contents, silica contents below 50 mol % appear to be preferable for applications in which temperatures above 1400° C. may be experienced.

While the above examples were based on a 900° C. temperature treatment, the fibre produced is largely amorphous at this point and to produce predominantly crystalline fibres higher temperature treatments are likely to be required, e.g. 1000° C. to 1250° C., preferably above 1100° C.

Shrinkage is not the only mechanical property that is important for fibres used for thermal insulation and particularly for support structures for pollution control devices. Also of importance is compressive strength of the insulation or support structure. The applicants tested this by the method described below with a view to giving an indication of the expected hot compression performance of fibres in a pollution control device such as a catalytic converter support mat application.

In detail the density (g/cm³) of the fibre to be tested is measured using helium pycnometry and the shot content (%) of the fibre to be tested is measured using a Jet Sieve with a 53 micron sieve as the smallest sieve.

The quantity of fibre to be used in each sample is calculated to give an equivalent volume of fibre to a typical commercial sol-gel fibre at 0.3 g/cm³.

A vacuum formed preform is then prepared by:
weighing the calculated appropriate amount of dry fibre for one sample into a beaker
adding ~600 ml starch solution to the beaker
mixing by spatula to remove clumps
pouring the fibre and starch into a 75 mm square vacuum mould using a fine mesh in the mould
stirring gently with a spatula to ensure the distribution of fibre in the mould is even.
applying a vacuum to the underside of the mesh
disassembling the mould and pushing the sample out onto Teflon paper on a drying tray
drying overnight at 110° C.

The pad is then clamped between two stainless steel plates separated at 5 mm using spacers. The clamped pad is then exposed to 900° C. for 4 hours using a ramp rate of 100° C./hr to get to that temperature. After exposure to temperature the pad is removed and tested on an Instron® machine using the compression resilience method which the force required to maintain compression of the test samples at 5 mm after a 5 minute hold at 5 mm A plot of the compressive strength of vacuum formed pads comprised of fibres having varying concentration of calcium oxide and strontium oxide and heat treated at 1100° C. to produce crystallinity is shown in FIG. 7. This shows that increasing amounts of calcium oxide in the fibrous material results in an increase in compressive strength and effectively doubles strength at levels of ~20 wt % CaO addition. SrO addition also increases compressive strength but the highest addition showed a diminution in strength. The applicants hypothesise that this may be due to reaction with the stainless steel plates used, since there was a yellowing of the fibre. A typical compressive strength generally required for use in exhaust system catalytic converters is in excess of 40 kPa, preferably in excess of 50 kPa.

The composition with the "best" results considered as a compromise between solubility, shrinkage, friability and lack of reactivity with other fibres, was a composition of an approximately mullite composition with addition of about 20 wt % CaO made from the recipe:

| Component | Weight % |
|---|---|
| Aluminium chlorohydrate solution [50% by weight, made by Reheis, trade name 'Chlorohydrol']. | 44.42% |
| Aluminium chlorohydrate [made by Reheis - trade name 'Microdry'] | 16.73% |
| Polyethylene Oxide [molecular weight ~300,000, made by Dow Chemical Company, trade name 'Polyox WSR N750'] | 0.56% |
| Siloxane [25% silica yield made by Dow Corning - trade name '193 fluid'] | 28.89% |
| Colloidal silica [a 40% $SiO_2$ yield cationic colloidal silica with a particle size 40 nm, made by Eka Chemicals - trade name is 'Bindzil Cat 80'] | 5.32% |
| Water | 4.07% |
| Calcium Nitrate Tetrahydrate | 29.00%. |

The results indicated above are those from an experimental program and the conditions used in manufacture, and the properties of the resultant fibres, may differ significantly from those indicated. However the general principle that use of alkaline earth oxides and alkali metal oxides in sol-gel fibres improves solubility in physiological saline solutions indicative of a reduced biopersistence has been demonstrated. The applicants have also shown that such additions may have positive effects on the thermal and mechanical properties of such sol-gel fibres depending upon the amount added. The invention therefore contemplates a range of fibres, some having large quantities of additives to give high solubility while having acceptable properties at low to middle range temperatures [e.g. 900° C.-1100° C.]; and other compositions having lower quantities of additives and usable at higher temperatures [e.g. 1100° C. to 1500° C.] while still retaining an acceptable [if not the highest] solubility in physiological saline.

For example, the insulation could have a maximum continuous use temperature of ~1000° C. and comprise more than 20 mol % alkaline earth oxide or alkali metal oxide. Compositions that could be made by this method include, for example, anorthite [$CaO.Al_2O_3.2SiO_2$] and neptheline [$Na_2O.Al_2O_3.SiO_2$] which are known to have dissolution rates very similar to some of the low biopersistent glasses. The applicant suspects that the same may be true of other alkali and alkaline earth crystalline silicates or aluminosilicates (e.g. leucite [$K_2O.Al_2O_3.4SiO_2$] and wollastonite [$CaO.SiO_2$]), and these crystalline structures withstand 1000° C. Glassy materials tend to be more soluble than crystalline materials and the invention is not limited to crystalline materials, although crystalline materials may give better mechanical properties.

Other compositions having lower quantities of additives and usable at higher temperatures [e.g. 1100° C. to 1500° C.] while still retaining an acceptable [if not the highest] solubility in physiological saline may for example, comprise less than 20 mol % alkaline earth oxide or alkali metal oxide [see for example sample 0127 above which comprises 14.4% CaO, has a 24 hour static solubility of ~20 ppm/m²/g, and has an effectively zero shrinkage across the temperature range 1000° C. to 1500° C.].

By adjustment of viscosity and fibre forming technique it is possible to control fibre diameter to some extent [witness the range of average diameters for commercial fibres indicated above]. The current European regulatory regime applies differing labelling requirements for silicate fibres that comprise less than 18% alkaline earth and alkaline oxide according to their diameter. Fibres of this type with a length weighted geometric mean diameter >6 μm are not classified as carcinogens [on the basis of supposed lower respirability than finer fibres]. However for the best insulating effect at high temperatures fibre diameters of <5 μm, typically around 3±1 μm, are preferred. Accordingly, depending upon application, the invention contemplates the use of fibres having a length weighted geometric mean diameter of <6 μm, preferably <5 μm, more preferably less than 4 μm, to provide low thermal conductivity in an insulating body [such as for example a blanket] and/or thicker fibres having a length weighted geometric mean diameter of >6 μm, preferably <15 μm to provide lower respirability. Preferably, such thicker fibres have <0.1% by number of the fibres with a diameter <3 μm.

[Accordingly the present invention contemplates that the fibres have a length weighted geometric mean diameter of <15 μm].

Use of length weighted geometric mean in connection with fibres is a method of allowing for the fact that shorter fibres are more respirable than longer fibres. Typically this is measured by observing a set of fibres using scanning electron microscopy with a magnification typically of X5000. A line is placed across the SEM screen and the diameters of those fibres that cross the line are measured. The probability that a fibre will cross the line is related to the length of the fibre and therefore corrects for the bias due to the fibre length. At least 300 fibres are measured. The calculation method involves:

| | |
|---|---|
| measuring the diameter of n fibres | $(d_1 \ldots d_n)$ |
| calculating the natural log for each fibre diameter | $\ln(d_1 \ldots d_n)$ |
| calculating the average $x_{ln}$ of the logged fibre diameters | $\Sigma(\ln(d_1 \ldots d_n))/n$ |
| taking the exponential of that average | $e^{x_{ln}}$. |

Under the relevant European legislation classification as "carcinogenic" can, be omitted provided that it can be demonstrated that fibres have a length weighted geometric mean diameter less two standard errors greater than 6 μm. for this calculation the method comprises:

| | |
|---|---|
| measuring the diameter of n fibres | $(d_1 \ldots d_n)$ |
| calculating the natural log for each fibre diameter | $\ln(d_1 \ldots d_n)$ |
| calculating the average $x_{ln}$ of the logged fibre diameters | $\Sigma(\ln(d_1 \ldots d_n))/n$ |
| calculating the standard deviation $\sigma_{ln}$ of the logged fibre diameters | $\Sigma(\ln(d_1) - x_{ln})/(n-1)$ |
| Calculating the standard error $\epsilon_{ln}$ of the logged fibre diameters | $\sigma_{ln}/n^{1/2}$ |
| taking the exponential of the average less two standard errors | $\text{Exp}(x_{ln} - 2\epsilon_{ln})$ |

It can be of advantage for this figure to be greater than 6 μm in some applications. Blending of either or both types of sol-gel fibre [diameter < or >6 μm] with melt formed fibres is contemplated within the invention [see for example WO00/75496 which describes the beneficial effects of mixing sol-gel fibres with melt formed fibres in high temperature support mats for catalytic converters and like pollution control devices]. The melt formed fibres may be alkaline earth silicate fibres.

Alkaline earth silicate fibres have received a definition in the Chemical Abstract Service Registry [Registry Number: 436083-99-7] of:

"Chemical substances manufactured in the form of fibers. This category encompasses substances produced by blowing or spinning a molten mixture of alkaline earth oxides, silica and other minor/trace oxides. It melts around 1500° C. (2732° F.). It consists predominantly of silica (50-82 wt %), calcia and magnesia (18-43 wt %), alumina, titania and zirconia (<6 wt %), and trace oxides.".

This definition reflects European Health and Safety regulations which impose special labelling requirements on vitreous silicate fibres containing less than 18% alkaline earth oxides. While such labelling is not required on crystalline fibres, the present invention permits the achievement of such a level of alkaline earth oxides in the claimed fibres particularly for medium temperature range applications [e.g. 900° C.-1100° C.].

Such fibres may be particularly useful in the manufacture of thermal insulation or support structures for use in automotive exhaust system catalytic converters and diesel particulate filters, and an automotive exhaust system catalytic converter or diesel particulate filter may comprise thermal insulation or support structures made of such fibres. The thermal insulation or support structures may support directly or indirectly a catalyst body and may be in the form of a mat or in the form of vacuum formed bodies [e.g. so-called "end cones"].

Conveniently, the thermal insulation may be in the form of needled blanket, but other known forms (for example felts, papers, vacuum formed shapes) are contemplated and fall within the scope of this invention.

Blending of fibres is a known method of achieving required mechanical or thermal properties. The fibres of the present invention may be blended with other fibres [e.g. other sol-gel fibres or alkaline earth silicate fibres].

The fibres of the present invention may also be used as reinforcement materials in cements, plastics, or other composite materials.

It is known to use fibrous materials as a component of friction materials. The present invention encompasses the use of the fibres of the invention in friction materials.

The invention claimed is:

1. Sol-gel formed fibres comprising in mol %:
   $Al_2O_3$ and $SiO_2$ in such amounts that $Al_2O_3+SiO_2$ is in the range of 50% to 99% and in which $Al_2O_3$ is present in amounts of at least 25 mol %; and
   one or more alkaline earth oxides and/or alkali metal oxides comprising in total 5%-30%, wherein the alkaline earth metal oxide comprises one or more of calcium oxide, strontium oxide, barium oxide or a mixture thereof.

2. Thermal insulation comprising sol-gel formed fibres as claimed in claim 1.

3. Sol-gel formed fibres, as claimed in claim 1, in which $Al_2O_3+SiO_2$ is in the range 65% to 95%.

4. Thermal insulation, as claimed in claim 2, in which the alkaline earth metal oxide is CaO, SrO or mixtures thereof.

5. Thermal insulation, as claimed in claim 4, in which the alkaline earth metal oxide is CaO.

6. Thermal insulation, as claimed in claim 4, in which the alkaline earth metal oxide additionally comprises magnesium oxide.

7. Thermal insulation, as claimed in claim 4, in which the amount of CaO is less than 25 mol %.

8. Thermal insulation, as claimed in claim 2, in which $SiO_2$ is present in amounts less than 50 mol %.

9. Thermal insulation, as claimed in claim 2, in which the thermal insulation comprises alkaline earth oxides in an amount greater than 18 wt %.

10. Thermal insulation, as claimed in claim 2, in which the thermal insulation is in the form of a needled blanket.

11. Thermal insulation, as claimed in claim 2, in which the sol-gel formed fibres have a length weighted geometric mean diameter of <15 μm.

12. Thermal insulation, as claimed in claim 3.

13. Sol-gel formed fibres, as claimed in claim 1, in which said one or more alkaline earth oxides comprises CaO, SrO, or a mixture thereof.

14. Sol-gel formed fibres, as claimed in claim 13, in which the one or more alkaline earth oxides is CaO.

15. Sol-gel formed fibres, as claimed in claim 13, in which the one or more alkaline earth oxides additionally comprises magnesium oxide.

16. Sol-gel formed fibres, as claimed in claim 1, in which the fibres are predominantly crystalline.

17. Sol-gel fibres, as claimed in claim 1, in which the fibres have a length weighted geometric mean diameter of <15 μm.

18. Sol-gel fibres, as claimed in claim 17, in which the fibres have a length weighted geometric mean diameter of <6 μm.

19. Sol-gel fibres, as claimed in claim 18, in which the fibres have a length weighted geometric mean diameter of <5 μm.

20. Sol-gel fibres, as claimed in claim 19, in which the fibres have a length weighted geometric mean diameter of 3±1 μm.

21. Sol-gel fibres, as claimed in claim 17, in which the fibres have a length weighted geometric mean diameter of >6 μm.

22. A fibrous body comprising sol-gel fibres as claimed in claim 1.

23. A fibrous body as claimed in claim 22, comprising additionally melt formed fibres.

24. A fibrous body, as claimed in claim 23, in which the melt formed fibres are or comprise alkaline earth silicate fibres.

25. A fibrous body as claimed in claim 22, comprising sol-gel fibres in which the fibres have a length weighted geometric mean diameter of <6 μm, blended with sol-gel fibres in which the fibres have a length weighted geometric mean diameter of >6 μm.

26. An exhaust system catalytic converter or diesel particulate comprising a catalyst body supported directly or indirectly by a fibrous body as claimed in claim 22.

27. A method of producing sol-gel fibres as claimed in claim 1 comprising:
    forming a sol comprising precursors for aluminum oxide, silicon oxide, and one or more alkaline earth oxides and/or alkali metal oxides;
    forming fibres from the sol by a rotary process in which the sol is flung from a rotor and then blasted by a gas which acts to dry and gel the sol to form a fibre;
    further drying said fibres; and
    firing the resultant fibres at a temperature in excess of 900° C. to produce fibres.

28. A method, as claimed in claim 27, in which the fibres have a length weighted geometric mean diameter of <15 μm.

29. A method, as claimed in claim 27, in which the firing of the fibres takes place at a temperature in excess of 1000° C.

30. Thermal insulation, as claimed in claim 2, in which said refractory base composition totals more than 70 mol % of the composition.

31. Thermal insulation, as claimed in claim 2, in which said refractory base composition totals more than 80 mol % of the composition.

32. Thermal insulation, as claimed in claim 4, in which the amount of CaO is less than 20 mol %.

33. Sol-gel formed fibres comprising in mol %:
    $Al_2O_3$ and $SiO_2$ in such amounts that $Al_2O_3+SiO_2$ is in the range 50% to 99% and in which $Al_2O_3$ is present in amounts of at least 25 mol %; and
    one or more alkaline earth oxides and/or alkali metal oxides comprising CaO, SrO, or mixtures thereof and wherein CaO is less than 25 mol %.

34. Sol-gel formed fibres, as claimed in claim 33, in which $Al_2O_3+SiO_2$ is in the range 65% to 95%.

35. Sol-gel formed fibres, as claimed in claim 33, in which the one or more alkaline earth oxides is CaO.

36. Sol-gel formed fibres, as claimed in claim 33, in which the one or more alkaline earth oxides additionally comprises magnesium oxide.

37. Sol-gel formed fibres, as claimed in claim 33, in which the fibres are predominantly crystalline.

38. Sol-gel fibres, as claimed in claim 33, in which the fibres have a length weighted geometric mean diameter of <15 μm.

39. Sol-gel fibres, as claimed in claim 38, in which the fibres have a length weighted geometric mean diameter of <6 μm.

40. Sol-gel fibres, as claimed in claim 39, in which the fibres have a length weighted geometric mean diameter of <5 μm.

41. Sol-gel fibres, as claimed in claim 40, in which the fibres have a length weighted geometric mean diameter of 3±1 μm.

42. Sol-gel fibres, as claimed in claim 38, in which the fibres have a length weighted geometric mean diameter of >6 μm.

43. A fibrous body comprising sol-gel fibres as claimed in claim 33.

44. A fibrous body as claimed in claim 43, comprising additionally melt formed fibres.

45. A fibrous body, as claimed in claim 44, in which the melt formed fibres are or comprise alkaline earth silicate fibres.

46. An exhaust system catalytic converter or diesel particulate comprising a catalyst body supported directly or indirectly by a fibrous body as claimed in claim 43.

47. Thermal insulation comprising sol-gel formed fibres as claimed in claim 33.

48. Thermal insulation as claimed in claim 47, in which the thermal insulation is in the form of a needle blanket.

* * * * *